United States Patent
Lynton et al.

(10) Patent No.: US 9,081,782 B2
(45) Date of Patent: Jul. 14, 2015

(54) SYSTEMS AND METHODS FOR DYNAMICALLY GENERATING GRAPHICAL MEMORABILIA PROJECTS FOR PRESENTATION AND USE

(75) Inventors: Jeanette Lynton, Pleasant Grove, UT (US); Brian Holman, Provo, UT (US); Kristy McDonnell, Pleasant Grove, UT (US); Kristine Widtfeldt, Springville, UT (US)

(73) Assignee: CABIN CREEK, LLC, Pleasant Grove, UT (US)

( * ) Notice: Subject to any disclaimer, the term of this patent is extended or adjusted under 35 U.S.C. 154(b) by 774 days.

(21) Appl. No.: 12/471,330

(22) Filed: May 22, 2009

(65) Prior Publication Data

US 2009/0287990 A1     Nov. 19, 2009

Related U.S. Application Data

(63) Continuation-in-part of application No. 11/601,571, filed on Nov. 17, 2006.

(51) Int. Cl.
  *G06F 17/00* (2006.01)
  *G06F 17/30* (2006.01)
(52) U.S. Cl.
  CPC ................. *G06F 17/30056* (2013.01)
(58) Field of Classification Search
  None
  See application file for complete search history.

(56) References Cited

U.S. PATENT DOCUMENTS

| | | | |
|---|---|---|---|
| 3,735,516 A | 5/1973 | Wenstrom | |
| 5,233,513 A | 8/1993 | Doyle | |
| 5,900,002 A * | 5/1999 | Bottomly | 715/209 |
| 6,097,389 A | 8/2000 | Morris et al. | |
| 6,144,974 A * | 11/2000 | Gartland | 715/205 |
| 6,222,947 B1 | 4/2001 | Koba | |
| 6,230,173 B1 | 5/2001 | Ferret et al. | |
| 6,358,341 B1 | 3/2002 | Bergquist | |
| 6,418,635 B1 | 7/2002 | Nelson et al. | |
| 6,596,032 B2 | 7/2003 | Nojima et al. | |

(Continued)

FOREIGN PATENT DOCUMENTS

KR   10-2008-0108927    12/2008

OTHER PUBLICATIONS http://www.shutterfly.com, Aug. 2005.*

(Continued)

*Primary Examiner* — Keith Bloomquist
(74) *Attorney, Agent, or Firm* — David B. Tingey; Bryant J. Keller; Kirton McConkie

(57) ABSTRACT

Systems and methods for generating and physically rendering graphical memorabilia projects are described herein. Generally, the methods comprise providing and organizing photos, selecting a theme-based kit, selecting a dynamic page layout template, selecting a design and color palette, personalizing a memorabilia project comprising the template, and physically rendering the memorabilia project. The page layout template is pre-designed template and configured to be selectively rotated and/or swapped to provide a refreshing theme and/or look, and can be used to more effectively utilize the memorabilia available for mounting and/or storage. The ability to rotate and/or swap the templates enables a user to reuse pre-established templates to create new looks and presentations. In one aspect, the described system is a web-based service that does not require any software to be installed on the user's computer device other than a web browser.

24 Claims, 25 Drawing Sheets

(56) References Cited

U.S. PATENT DOCUMENTS

| | | |
|---|---|---|
| 6,660,119 B2 | 12/2003 | Allen et al. |
| 6,690,843 B1 | 2/2004 | Squilla et al. |
| 7,082,436 B1 | 7/2006 | Bayiates |
| 7,177,045 B2 | 2/2007 | Goel et al. |
| 7,327,905 B2 | 2/2008 | Tsue et al. |
| 7,412,659 B2 * | 8/2008 | Wessling et al. ............ 715/764 |
| 7,469,380 B2 * | 12/2008 | Wessling et al. ............ 715/273 |
| 7,474,801 B2 * | 1/2009 | Teo et al. ............ 382/284 |
| 7,594,174 B2 * | 9/2009 | Truelove et al. ............ 715/269 |
| 7,617,449 B2 * | 11/2009 | Carlson et al. ............ 715/243 |
| 7,689,909 B1 * | 3/2010 | Szuszczewicz ............ 715/243 |
| 7,900,139 B2 * | 3/2011 | Hosotsubo ............ 715/247 |
| 8,024,658 B1 | 9/2011 | Fagans et al. |
| 2002/0180203 A1 | 12/2002 | McIntyre et al. |
| 2003/0020956 A1 | 1/2003 | Goel et al. |
| 2003/0160824 A1 * | 8/2003 | Szumla ............ 345/769 |
| 2003/0167447 A1 | 9/2003 | Hatta et al. |
| 2004/0088420 A1 | 5/2004 | Allen et al. |
| 2004/0145603 A1 | 7/2004 | Soares |
| 2004/0194034 A1 * | 9/2004 | Vlamis ............ 715/530 |
| 2004/0201613 A1 | 10/2004 | Simpson et al. |
| 2004/0250205 A1 | 12/2004 | Conning |
| 2005/0253371 A1 | 11/2005 | Connolly |
| 2006/0026528 A1 | 2/2006 | Paulsen et al. |
| 2006/0038835 A1 | 2/2006 | Cao |
| 2006/0059427 A1 * | 3/2006 | Reid et al. ............ 715/731 |
| 2006/0109516 A1 | 5/2006 | Catalan et al. |
| 2006/0206836 A1 | 9/2006 | Wessling et al. |
| 2007/0033542 A1 * | 2/2007 | Winser et al. ............ 715/788 |
| 2007/0043830 A1 | 2/2007 | Housenbold et al. |
| 2007/0253029 A1 | 11/2007 | Yamaguchi |
| 2008/0120535 A1 | 5/2008 | Lynton |
| 2008/0215964 A1 | 9/2008 | Abrams et al. |
| 2008/0228866 A1 | 9/2008 | Minatogawa et al. |

OTHER PUBLICATIONS

Cox, Joyce, and Lambert, Joan, Microsoft Office Publisher 2007 Step by Step, Aug. 15, 2007, published by Microsoft Press, Chapter 2 pp. 1-5, Chapter 3 pp. 1-6.*

Lynton, Jeanette R., "Cherish" (ISBN 978-1-4236-0154-8), 2005, Gibbs Smith, Layton, UT, pp. 1-128.

Lynton, Jeanette R., "Imagine" (ISBN 978-1-4236-0436-5), 2007, Gibbs Smith, Layton, UT, pp. 1-128.

Lynton, Jeanette R., "Originals" (ISBN 978-1-4236-5), 2008, Gibbs Smith, Layton, UT, pp. 1-128.

Lynton, Jeanette R., "Reflections" (ISBN 978-1-4236-0311-5), 2007, Gibbs Smith, Layton, UT, pp. 1-127.

Lynton, Jeanette R., "Wishes" (ISBN 978-4236-0437-2), 2009, Gibbs Smith, Layton, UT, pp. 1-128.

Microsoft Publisher 2003; 2003 Microsoft Corporation.

Microsoft Publisher 2003; Figs. 1-26; pp. 1-17.

* cited by examiner

SYSTEMS AND METHODS FOR DYNAMICALLY GENERATING GRAPHICAL MEMORABILIA PROJECTS FOR PRESENTATION AND USE

RELATED APPLICATIONS

This application claims priority to and is a continuation-in-part application of U.S. patent application Ser. No. 11/601,571, which was filed on Nov. 17, 2006 and entitled SYSTEMS AND METHODS FOR MOUNTING MEMORABILIA, and which is incorporated herein by reference.

BACKGROUND OF THE INVENTION

1. Field of the Invention

The present invention relates to the presentation and/or storage of memorabilia. In particular, the present invention relates to systems and methods for dynamically generating graphical memorabilia projects for presentation and use in a manner that provides an enhanced opportunity for the creative involvement of users and even enables novices to produce high quality results tailored to their own photos and preferred design kits.

2. Background and Related Art

Photographs can be placed in albums of varying styles, where they are mounted for viewing on one or more pages in a format resembling a book. Such book-like formats are photo albums or scrapbooks that permit the convenient storage of photographs.

While book-like formats are currently available, challenges still exist. One such example is that in some book-like formats the photographs are simply placed into the photo album without much variation. Accordingly, the presentation remains lacking. Another example is that while some book-like formats have been used to provide a personal touch to the overall look of the page layout, a challenge exists in the ability to provide new, refreshing, and creative looks to the pages.

Thus, while methods currently exist that are used to assist persons in mounting photographs, challenges still exist. Accordingly, it would be an improvement in the art to augment or even replace current methods or techniques with other methods or techniques.

SUMMARY OF THE INVENTION

The present invention relates to the presentation and/or storage of memorabilia. In particular, the present invention relates to systems and methods for dynamically generating graphical memorabilia projects for presentation and use in a manner that provides an enhanced opportunity for the creative involvement of users and even enables novices to produce high quality results tailored to their own photos and preferred design kits.

Implementations of the present invention take place in association with systems and methods that allow end-users to create customized memorabilia projects, including scrapbook layouts, cards, photo displays, journal displays, photo albums, slide shows, presentations, journals, printed matter, histories, displays, remembrances, or any other suitable projects that can be organized in a digital form on a computer device and then be professionally rendered, whether electronically or in a custom print format.

In at least some implementations, the end-user creates a finished memorabilia project by uploading and organizing images or other suitable media, selecting a digital edition of a design kit, choosing an appropriate pattern or dynamic layout template, selecting a design and/or color palette for the given design kit and pattern/template combination, personalizing one or more pages of the project, and then purchasing and/or initiating rendering of the project. In some instances, the rendering is through a custom professional printout of the project.

In at least some implementations, a set of dynamic patterns or templates are utilized in creating a given project. The patterns or templates have a particular methodology of application, namely the capability of being swapped and/or rotated in a myriad of ways without losing the composition, balance, or design integrity of the project, page and/or layout. The templates or patterns consistently achieve the desired effects while using standard-sized photos cut along, for example, the full inch, half inch, or quarter inch at the smallest increment.

The end-user can start the project by being prompted to name the project before proceeding through the activities. A dynamic layout template is used as a basis for creating a layout (or one or more templates with scrapbook media placed therein), according to which design elements or media are arranged. In at least some implementations, a layout is used to create one or more pages for inclusion within, for example, a scrapbook, where memories are recorded and media, including memorabilia, background designs, images, text, etc., are selectively included into the project.

The dynamic layout template is a pre-designed template that is configured to be able to be selectively rotated and/or swapped to provide a refreshing theme and/or look, and can be used to more effectively utilize the memorabilia available for mounting and/or storage. The ability to rotate and/or swap one or more templates in a project enables the user to reuse pre-established templates to create new and refreshing looks and presentations. Additionally, the ability to rotate the template allows the user to quickly vary the appearance of the layout while maintaining the composition, balance, and design integrity of the layout. Moreover, colors and/or objects can be added to enhance the themes of a layout. In one implementation, the templates include two templates per presentation that is shown on a display device (e.g., a monitor). Each of the templates can be selectively rotated and/or swapped with another template to provide a refreshing theme and/or look, and can be used to more effectively utilize the memorabilia available for mounting and/or storage.

In at least some implementations, the system is a web-based service that does not require any software to be installed on the end-user's computer device other than a web browser. This approach lowers the barrier to entry for adoption of the system due to the elimination of operating system installation problems and incompatibilities. In sum, the end-user is able to use the system to immediately create a memorabilia project by going to a website without the hassle or the risk of locally installing software on the end-user's computer device.

While the systems, methods, and processes of the present invention have proven to be particularly useful in the area of scrapbooking (i.e., creating photo albums and journal keeping), those skilled in the art can appreciate that the described systems and methods can be used in a variety of different applications and in a variety of different areas of industry to yield customized projects for presentation and use in a manner that provides the capability of aspects of the project to be able to be swapped or rotated in a myriad of ways without losing the composition, balance, or design integrity of the page and/or layout.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

Figure 1:
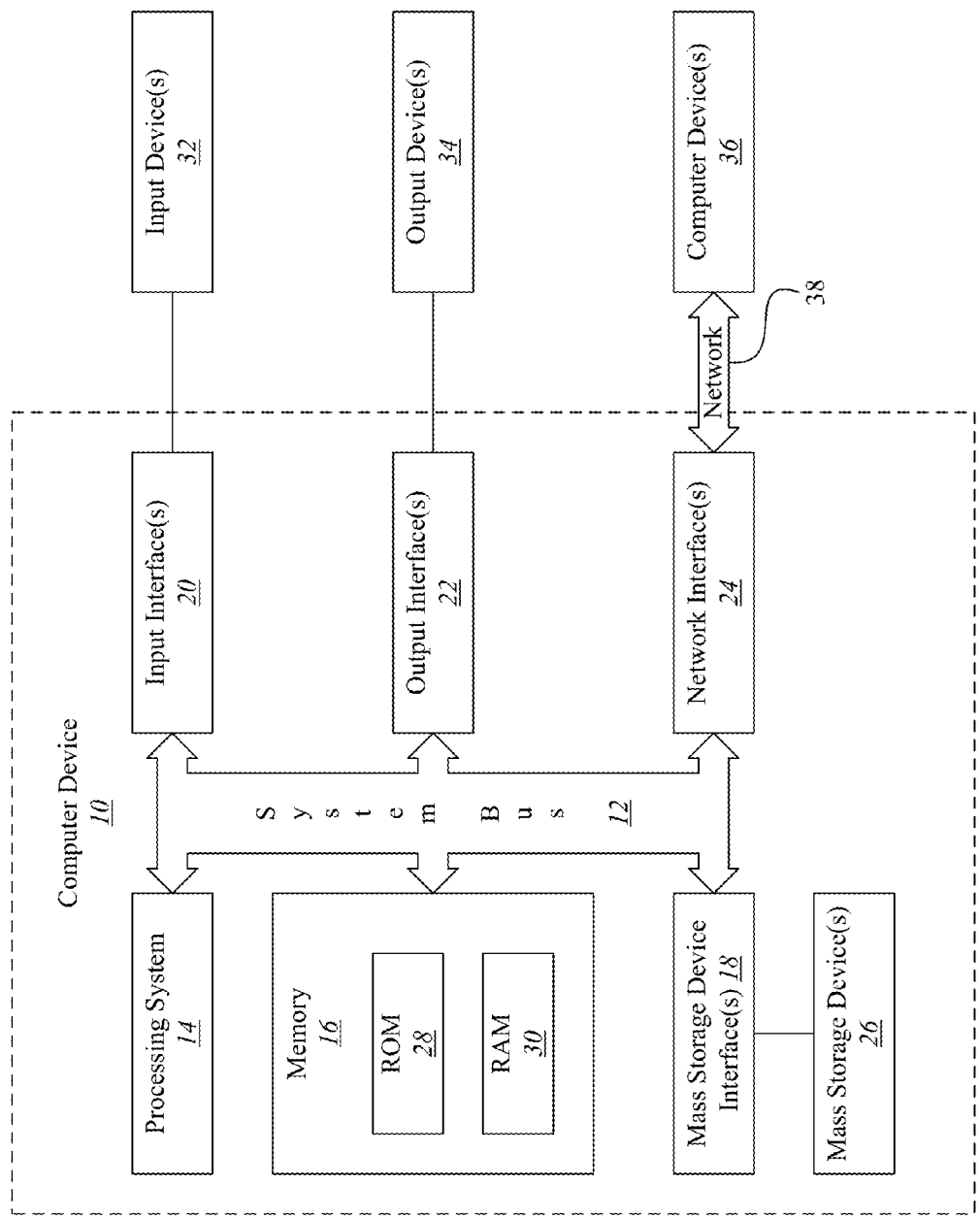
FIG. 1 illustrates a representative computer device for implementing some embodiments of the present invention.

The present invention relates to the presentation and/or storage of memorabilia. In particular, the present invention relates to systems and methods for dynamically generating graphical projects for presentation and use in a manner that provides an enhanced opportunity for the creative involvement of end users and even enables novices to produce high quality, professional results tailored to their own media and preferred kits.

Embodiments of the present invention take place in association with systems and methods that allow an end-user to create customized memorabilia projects, including scrapbooks, cards, photo displays, journal displays, photo albums, presentations, journals, printed matter, histories, displays, remembrances, and/or other projects that can be organized as a digital project on a computer device and then be professionally rendered, whether electronically or in a custom print format. Examples of memorabilia include text, graphics, pictures, photos, audio, video, etc.

The following disclosure of the present invention is grouped into two subheadings, namely "Representative Operating Environment" and "Dynamically Generating Graphical Memorabilia Projects for Presentation and Use." The utilization of the subheadings is for convenience of the reader only and is not to be construed as limiting in any sense.

Representative Operating Environment

Those skilled in the art will appreciate that some embodiments of the present invention embrace utilization of dynamic templates with the use of a computer device to create and/or use dynamic templates. Accordingly, FIG. 1 and the corresponding discussion are intended to provide a general description of a suitable operating environment in which methods of the present invention may be implemented. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for the methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing an embodiment of the present invention includes computer device 10, which may be a general-purpose or a special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
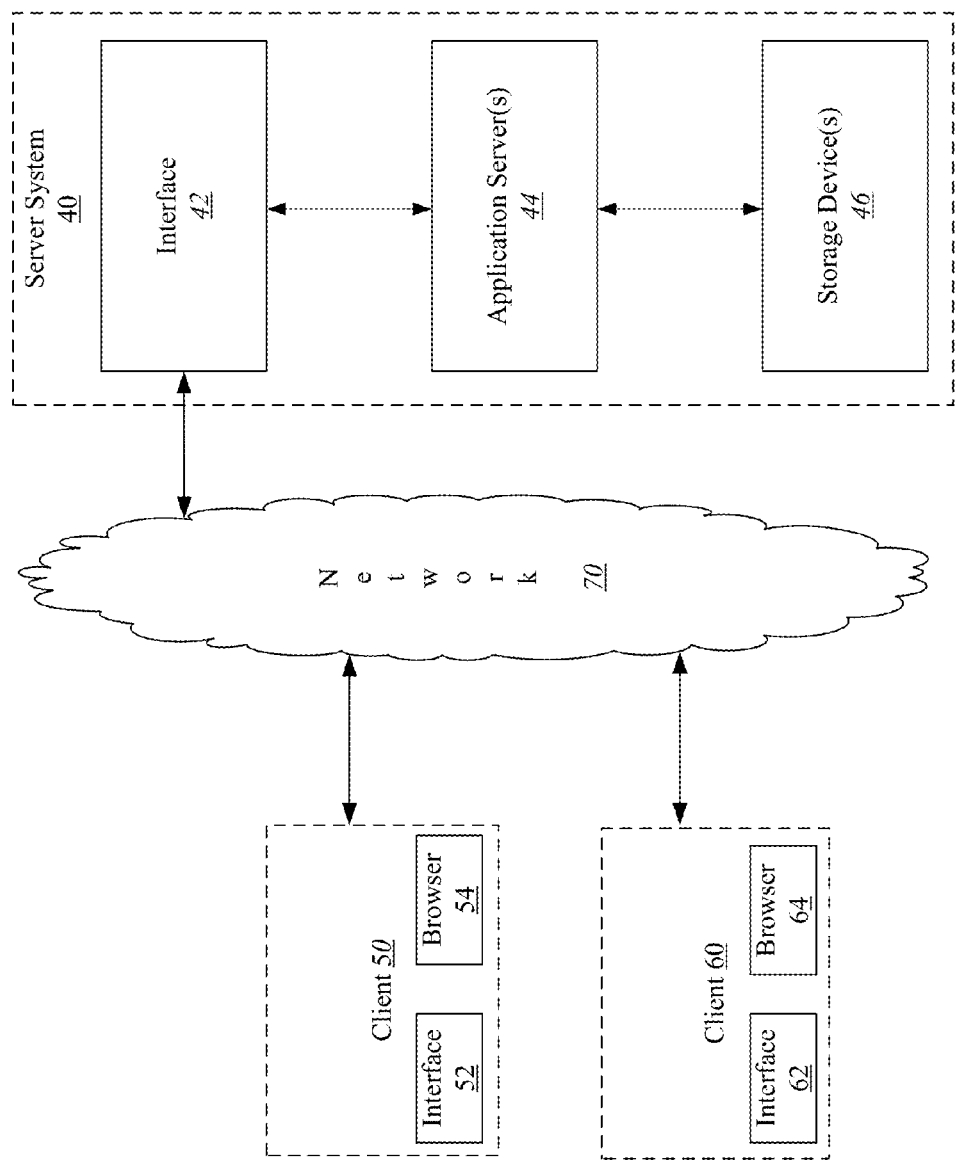
FIG. 2 illustrates a representative networked configuration for dynamically generating and rendering memorabilia projects in association with an embodiment of the present invention.

While those skilled in the art will appreciate that the invention may be practiced in networked computing environments with many types of computer system configurations, FIG. 2 represents an embodiment of the present invention that enables users at client devices to dynamically generate graphical memorabilia projects that are professionally rendered, whether electronically or in hard copy. Accordingly, in accordance with at least some embodiments of the present invention, individual users are able to dynamically generate memorabilia projects and place orders for professional rendering across a network so as to have the memorabilia professionally prepared for and distributed to intended recipients, which can be the individual users and/or others. While FIG. 2 illustrates an embodiment that includes two clients connected to the network, alternative embodiments include one client connected to a network or many clients connected to a network. Moreover, embodiments in accordance with the present invention also include a multitude of clients throughout the world connected to a network, where the network is a wide area network, such as the internet.

Further, while some embodiments embrace client/server architectures, some embodiments of the present invention include non-client/server architectures, including computer environments having a peer-to-peer architecture.

In FIG. 2, clearinghouse or server system 40 represents a system configuration that includes one or more servers that are used to access one or more resources, such as particular design kits, templates, design and/or color palettes, etc., for utilization in generating graphical memorabilia projects for presentation and use. By way of example, server system 40 may be a single server in cases where a single server can process and preserve the entire amount of information required to perform the methods and systems of the present invention, as will be further explained below. Alternatively, server system 40 may be a conglomeration of servers that process and preserve a high volume of information.

The emergence of the internet has enabled a very large number of computer devices across the world to be connected across a wide area network in order to participate in global communication. The following is a discussion of an embodiment of the present invention that includes a plurality of clients, illustrated as clients 50 and 60, which are connected to server system 40 across the internet, illustrated as network 70, in order to access resources for dynamically generating graphical memorabilia projects and to receive orders for professionally rendering the dynamically generated graphical memorabilia projects for presentation and use.

With reference to FIG. 2, clients 50 and 60 each include a network interface (respectively illustrated as network interfaces 52 and 62) and a web browser (respectively illustrated as browsers 54 and 64). Network interface 52 is a communication mechanism that allows a client, such as client 50 to communicate to clearinghouse 40 by a network 70, such as the internet. Browser 54 is an application program that allows information to be displayed on a monitor device as text and/or graphics in the form of a web page. A browser allows for the entering of uniform resource locator ("URL") to thereby access the corresponding web page. Therefore, clients 50 and 60 may independently access a web page that enables the transmission of information necessary to access resources to dynamically generate graphical memorabilia projects for presentation and use, and to place a request or order to have the generated pages be professionally rendered.

Server system 40 includes network interface 42, application server(s) 44, and storage device(s) 46. Network interface 42 is a communication mechanism that allows server system 40 to communicate with one or more clients by a network 70. Application server(s) 44 include one or more servers for processing and/or preserving information, and may be employed for providing and maintaining a web page that enables the accessing of resources and requesting of professional rendering. Storage device(s) 46 includes one or more storage devices for preserving information, such as resources, transactional information and/or rendering information to perform the methods enclosed herein.

Thus, a user at one of the clients, such as client 50, may access a web page maintained by one or more of the application servers 44 and electronically access resources to dynamically generate graphical memorabilia projects and to place an order to have the pages professionally rendered and distributed to intended recipients. The order for professional rendering is received by server system 40, processed at one of a limited number of rendering locations, and the professionally rendered product is shipped from the rendering location to the intended recipients.

While the discussion above has presented a representative system configuration for implementing various embodiments of the present invention, those skilled in the art will appreciate that the methods of the present invention and processes thereof may be implemented in a variety of different system configurations.

Dynamically Generating Graphical Memorabilia Projects for Presentation and Use

Accordingly, in at least some embodiments of the present invention, computer processing is provided to enable the user to utilize a dynamic template for subsequent professional rendering, whether electronic rendering or hardcopy printing or publishing. Additionally, in some embodiments, the described methods and systems for producing a memorabilia project (i.e., a card, one or more pages of a photo album, one or more pages of a journal, a display, a presentation, a history, a remembrance, or another project) comprise a digital, web-enabled service. As used, herein, the term "digital, web-enabled service" may refer to an online service that does not reside on the end-user's computer or require that any software, besides a web browser, to be installed on the end-user's local computer. This approach lowers the barrier to entry for adoption of the system due to the elimination of operating system install problems and incompatibilities. Moreover, this approach allows the end-user to immediately go to a website to create a project without the hassle or risk of installing software on the end user's computer device.

Figure 3:
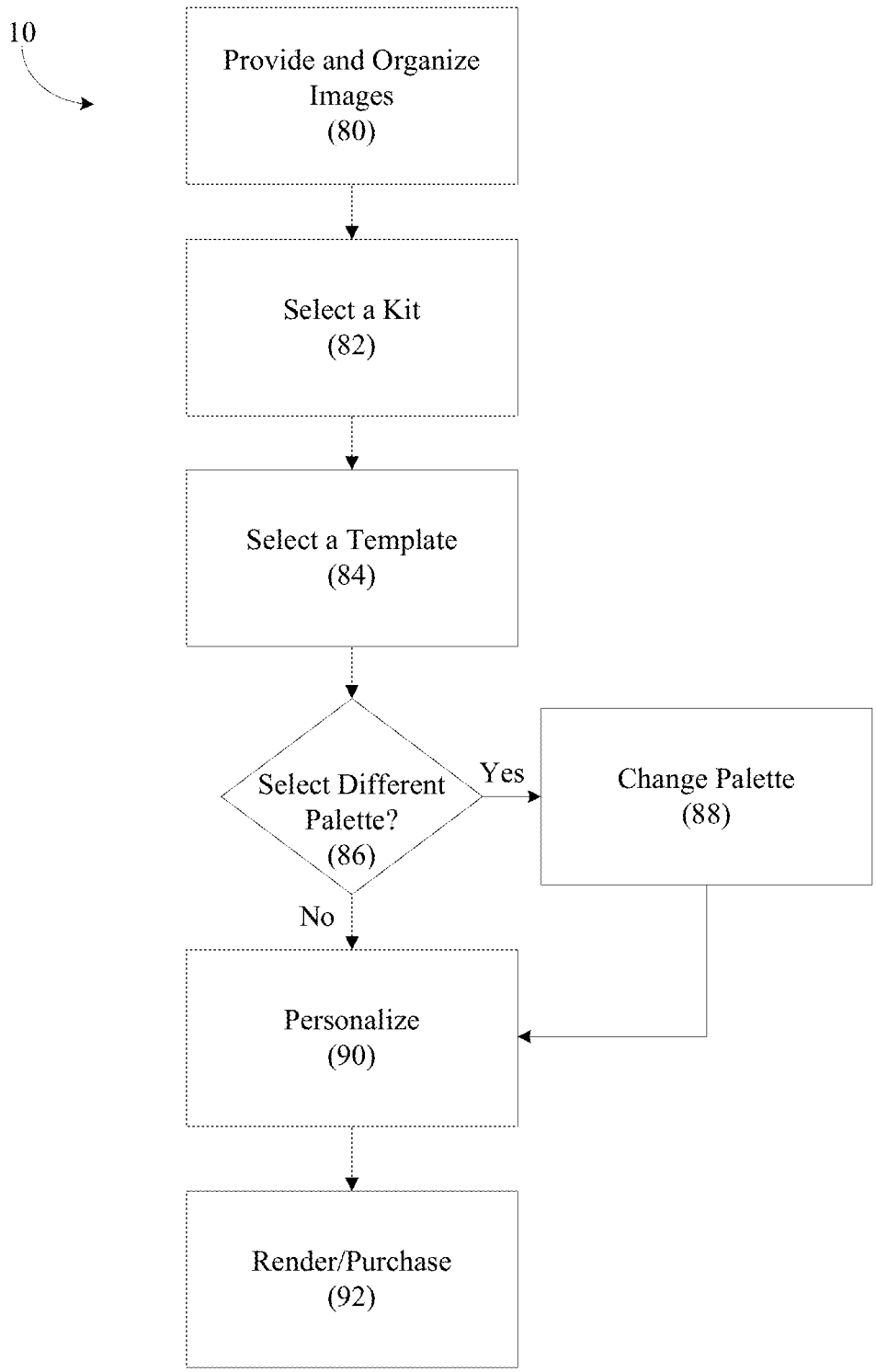
FIG. 3 provides a flowchart that illustrates a representative embodiment of the present invention.

While the described methods can be performed in any suitable manner, FIG. 3 shows a flow chart in which a representative embodiment of the method 10 includes uploading and organizing images (80), selecting a design kit (82), choosing an appropriate pattern or dynamic layout template (84), changing a design and/or color palette (86 and 88), personalizing the layout (90), and purchasing and/or initiating a physical rendering (92) of the project that has been produced through the method. To provide a better understanding of the described method, each of its aforementioned features will be individually discussed below.

Box 80 shows that in at least some embodiments, the method 10 begins as the end-user uploads, imports, or otherwise provides images (i.e., photos and graphics) or any other suitable form of media (e.g., text, picture, video, audio, etc.) for a particular project. While the images and other media can be organized in any suitable manner, in some embodiments, the images and media are organized by group. In such embodiments, a group is created by default to support a new specific project, and the group and the project (e.g., layout or album) share the same name (e.g., "Holiday 2008"). In some embodiments, the end-user can also create other project-specific groups to support other particular projects. In some such embodiments, the user can move or copy media (e.g., images) from one group to another.

The end-user stores a variety of images or other user-provided media that are not currently being used in a project. In some instances, images and media that are being used in a project have an iconic watermark to represent their use and that they are not able to be deleted.

Certainly, in some embodiments, multiple projects can include similar media. Thus, for example, a photo showing both a son and a daughter can be incorporated into multiple projects, namely (i) a scrapbook for the daughter, and (ii) a scrapbook for the son.

At box 82, the system includes a variety of digital design kits to choose from. Each kit includes a variety of virtual designs. In one example, a kit includes a collection of background designs, embellishments, and/or virtual stickers that include themed journaling elements, an alphabet, complimentary icons, and other decorative elements.

As used herein, the term "background designs," and variations thereof, may refer to one or more images or designs. Some images are of paper, cardstock, and the like. Moreover, the paper, cardstock, and similar media in the background design may have any suitable pattern (e.g., gingham), color (e.g., be monochromatic), color scheme, appearance of texture, or may have any suitable graphic (e.g., text, drawing, etc.) disposed thereon. In some typical embodiments, the background designs in a kit include six two-sided virtual paper designs, and four coordinating virtual cardstock colors. The six virtual paper designs in each kit follow an intentional array, loosely referred to as large pattern, medium pattern, small pattern, large stripe/plaid, small stripe/plaid, and near tonal/monochromatic. By following this design format, the kits are poised for balanced and professional extrapolation into the design and/or color palette system, which shall be described below.

In some embodiments, each of the design kits serves one or more themes, such as baby, celebration, family, feminine, heritage, holiday, masculine, outdoors, school/friends, sports/activities, vacation, wedding, and any other suitable theme. Accordingly, in such embodiments, the kits are theme-based. Generally, at box 82, the end-user is presented with a list of themes. As the user selects a particular theme, the user sees thumbnail views of a variety of kits within that theme. At box 82, the user is allowed to select the kit the user would like to use to create a personalized layout.

At box 84, the user selects a pattern or dynamic layout template available through the system. While the user may select from any suitable number of templates, in some instances, the user is able to select a template from about twenty-five, 12"×12", two-page layout templates that support from two to fifteen images, each.

The templates may have any suitable characteristics. In one example, each template is pre-designed by a professional artist. These pre-designed templates can help the end-user to easily produce professional looking projects, even with little to no prior scrapbooking experience.

Figure 4A:
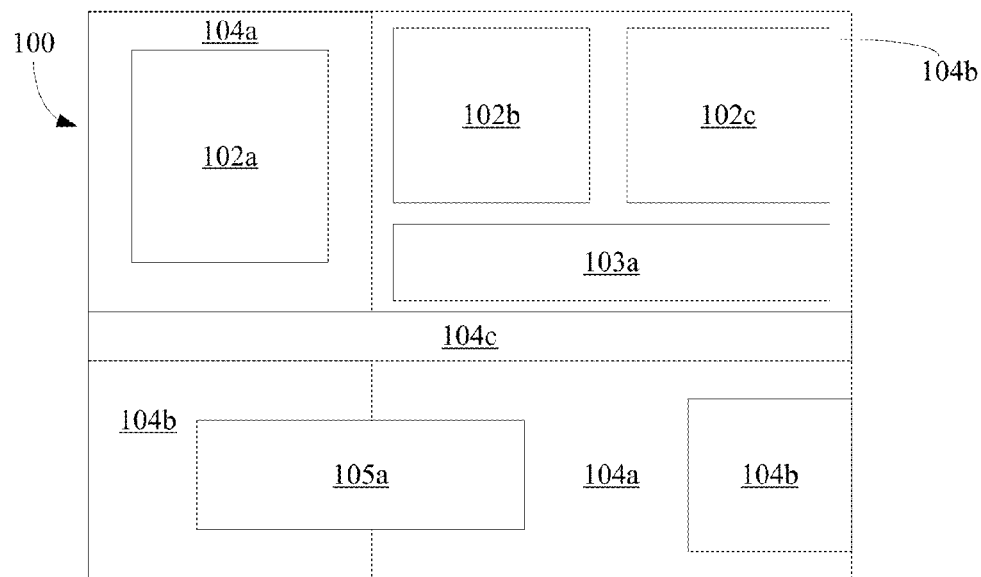
FIGS. 4A-4B illustrate representative templates associated with some embodiments. of the present invention.

The templates each generally include a plurality of media-specific wells or areas that are defined in the template and which are configured to receive a specific form of media. Indeed, a template may comprise a well for any suitable scrapbooking media, including, but not limited to, images (i.e., photos, graphics, etc.), text, background designs, video, audio, and the like. For instance, the wells can comprise defined areas that are configured to receive one or more images of a background design (i.e., images of paper and/or cardstock) ("background wells"), one or more photos or other images ("image wells"), journaling text ("journaling wells"), or title text ("title wells"). By way of illustration, FIG. 4A illustrates a representative embodiment of a dynamic template 100 comprising at least one image well 102, titling well 103, background well 104, and journaling well 105. Because each well is designed to receive one or more certain types of scrapbook media (e.g., background designs, images, journaling, or titles) while preventing one or more other forms of media from being placed therein, the templates can help guide the user to place scrapbooking media in the template in a balanced and aesthetically pleasing manner. For instance, by having a well that is specific to images and a well that is specific to titling, a template can guide the user to place media in the template in an aesthetically pleasing manner.

In some embodiments, a well is provided to attach a physical item after the project is professionally printed. For example, a location for a strand of hair is reserved so that the strand can be mounted or otherwise included after the scrapbook is professionally printed and delivered to the end user.

Figure 4B:
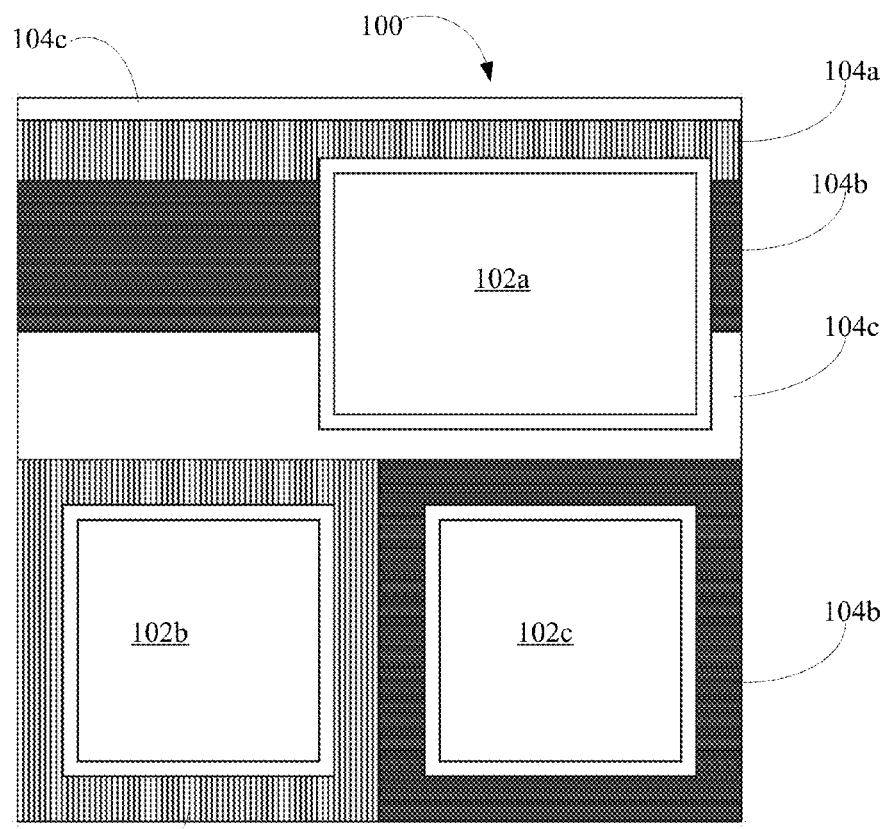

In certain embodiments, one or more of the various well types (e.g., background, image, journaling, or title wells) in a particular template and/or project are divided into classes. In one example, a well type (e.g., background wells) is divided into two or more classes. For instance, the variety of background wells in a template can be divided into two or three classes of virtual paper designs and two or three classes of virtual cardstock designs. To illustrate that a template can have more than one class of a specific well type, FIGS. 4A and 4B depict representative embodiments of templates 100 comprising multiple classes of image wells (e.g., 102a, 102b, and 102c) and background wells (e.g., 104a, 104b, 104c, and 104d).

In some embodiments in which a template comprises a specific well type that is divided into more than one class, wells of the same type and class are governed by rules that require wells of the same type and class to be treated in a similar manner. Indeed, in some instances, background wells of the same class (e.g., background wells 104a and 104a in FIG. 4A) will be filled with the same virtual style of paper or cardstock. In other instances, when a well of a specific type and class is personalized (as discussed below), other wells in the template of the same type and class are automatically and instantaneously personalized in the same manner. For example, distressing, rotating the media within, or changing the media color or design of a well, will cause other wells in the template and/or project that are of the same type and class to be personalized or changed in a similar manner. Accordingly, by changing one well, the described system and method will cause similar wells to be coordinated throughout a template.

Where the wells comprise image wells, the wells can be configured to receive any suitable image, including any suitable type or form of image. Indeed, in some embodiments, the image wells are configured to receive standard-sized photos. In such embodiments, the photos can be fit into the image wells in any suitable manner. For instance, when a photo is placed in a image well, the system can automatically crop (e.g., remove one inch, a half of an inch, a quarter of an inch, etc.) to allow the photo to fit in the well.

In order to make the template appear more like a physical memorabilia project (i.e. page), in some embodiments, one or more of the wells are layered on top of another well. By way of illustration, FIG. 4B shows an embodiment of the template 100 in which image well 102a is layered over background wells 104a, 104b, and 104c.

In some aspects, the dynamic templates are versatile and are not kit-specific. Instead, the kits can be applied to any of the available kits by following a consistent human-managed formula. Generally, when the user selects a template, the user will immediately see the template with the kit design chosen at 82 already applied to the template. In some embodiments, a default design and color palette is also applied to the template. In such embodiments, however, the user may choose to change the default design and color palette to a different design and color palette at any suitable time.

Figure 5:
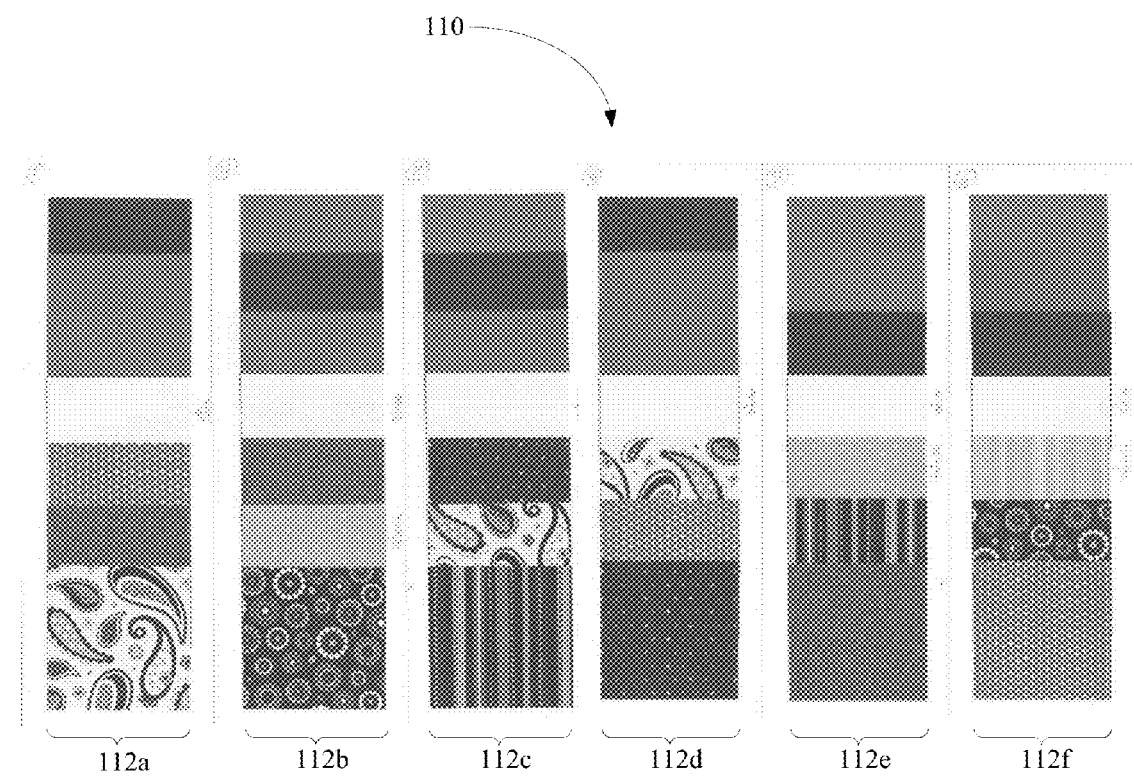
FIG. 5 illustrates a representative design and color palette in association with a representative embodiment of the present invention.

For example, box 88 shows that if the user decides at decision box 86 to change from the default design and color palette, the user can select another design and color palette to use with the template. At box 88, the end-user can select, for example, one of several (e.g., six) different ways of applying the kit papers and cardstocks to the given template, as shown in FIG. 5. Each one of the options 112 in FIG. 5 is called a design and/or color palette and comprises a selection of images or designed for use. Such images or designs can be coordinated paper and/or cardstock designs.

In some embodiments, a professional artist determines the available design and color palettes for a particular template in advance. Thus, in such embodiments, the colors and designs in a particular palette coordinate with each other as well as with the specific kit for which the palette is designed. Additionally, in some aspects, different pieces of virtual paper and/or cardstock in design and color palette that have the same pattern and/or color may be made to appear to have been cut from a larger piece of paper or cardstock. For instance, different pieces the same virtual paper can show different portions of a larger pattern. As a result, the described system provides the design and color palette with a more dynamic look.

The various design and color palettes showcase the diversity and flexibility of the system's kit designs. One kit can be used in distinct ways to create a totally different look as it is applied to a particular pattern. For example, a design and color palette 112e in FIG. 5 illustrates that one paper palette design (e.g., a palette that may emphasize, for example, a pink color from a background design as the primary paper design in the template) can have a decidedly feminine look, while another design and color palette 112f (e.g., a palette that may emphasize, for example, a blue color from a background design as the primary design) can have a more masculine feel. Accordingly, using the same kit, the end-user can select a decidedly more masculine or feminine look, depending on the subject of the images and the user's personal preference.

As previously explained, the system and method of the present invention generate a dynamic, complete scrapbooking template. As a result, the system provides an easy mechanism for the end-user to use to complete a finished project. While the templates are typically pre-designed before the user is able to utilize them, the templates can be modified in a variety of manners to allow the user to vary one page of a project from another.

Indeed, embodiments of the present invention allow for maximum user interaction, choice, and variability without requiring software expertise. For example, the user is allowed to choose a template, kit, design and color palette, and can even choose to rotate/swap the template to create an entirely different result. This selection matrix delivers dynamic, fresh results every time.

In accordance with at least some embodiments of the present invention, the system is designed to provide, for example, more than 5,700 unique, fully designed options based on a foundation of thirty eight kits with six design and color palettes, wherein each palette can be applied to twenty five different templates. In some embodiments, these final design templates are generated programmatically and do not require an artist to create them. In such embodiments, the templates and their associate rules can be programmatically connected to one or more particular design and color palettes to create the final layout.

FIGS. 6-11 shows some examples of suitable templates and methods for varying the appearance of a layout altering a template. Generally, a dynamic layout template is used as a basis for creating a layout to which design elements are attached. In at least some implementations, a layout is used to create a page or pages for inclusion within a scrapbook, where memories are recorded and scrapbook media (i.e., memorabilia objects, such as photographs) are selectively incorporated and stored.

While, in some embodiments, the positioning of a template's wells remains static within the template itself, the entire template (i.e., the wells) is configured to be selectively rotated and/or swapped with another template to provide a refreshing theme and/or look, and can be used to more effectively utilize the memorabilia available for mounting and/or storage. The ability to rotate and/or swap the templates enables the ability of the user to reuse pre-established templates to create new looks and presentations. Accordingly, the templates can be varied relatively easily to create new layout while maintaining the composition, balance, and design integrity of the layout. In addition, colors and/or objects can be added to enhance the themes. In one implementation, the templates include two templates per presentation that is shown on a display device (e.g., a computer monitor). Each of the templates can be selectively rotated and/or swapped with another template to provide a refreshing theme and/or look, and can be used to more effectively utilize the memorabilia available for mounting and/or storage.

In one embodiment, a set of multiple dynamic layout templates is provided on a computer display, wherein each dynamic layout template (i.e., the wells within the template) is designed and constructed in a manner that permits it to retain its design soundness and structural functionality when used in multiple rotational configurations, including, without limitation, rotational configurations at increments of ninety degrees.

The user selects a first dynamic layout template for rendering on a computer display and determines a rotational configuration in which that first dynamic layout template will be used. The user optionally selects a second dynamic layout template to create a two-page spread for rendering on the computer display with the first dynamic layout template, and determines a rotational configuration in which that second dynamic layout template will be used.

The user mounts media, including memorabilia, designs, text, and/or information items, in a design corresponding to the dynamic layout templates that the user previously selected. This mounting can be done electronically to allow the user to quickly see how the mounting will look. For example, the user can designate placement of particular photographs in particular wells, and can rotate the template to determine its preferred orientation and placement. Once completed, the computer device can initiate the print out of the layout to enable the user to create the layout by hand. Alternatively, the print out can be the final product for presentation.

In some embodiments, a page layout template may be provided as a usable instantiation, such as a pre-printed paper intended for use within a photo album or scrapbook. In other embodiments, a page layout template may be provided as an illustration within an instructional guide, where the user may refer to that illustration, including, without limitation, the measurements of the illustration or provided adjacent to the illustration, in order to independently construct a page based upon the information provided in the page layout template. In another embodiment, the template is an electronic orientation that includes pre-established locations that can be used in any rotational orientation.

Thus, embodiments of the present invention take place in association with a layout template that can be used as a basis for creating a page layout according to which design elements are arranged. In at least some embodiments, a layout is used to create a page or pages for inclusion within a scrapbook, where memories are recorded and memorabilia objects, including photographs, are selectively incorporated and stored.

Figure 6:
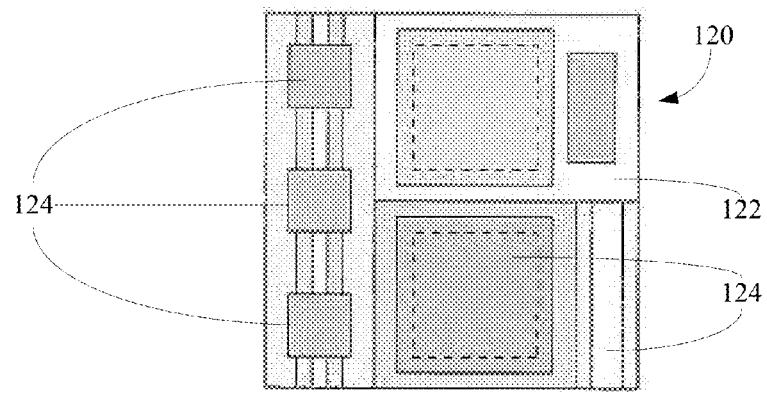
FIG. 6 illustrates another representative template in association with an embodiment of the present invention.

With reference now to FIG. 6, a representative system is illustrated. In FIG. 6, the system 120 comprises a page layout template 122 that can be illustrated in any number of formats and comprises one or more wells 124 that are intended as guides to the user to illustrate suggested placement of components of memorabilia to be mounted on a page that is created by the user, based upon the page layout template 122.

Figure 7:
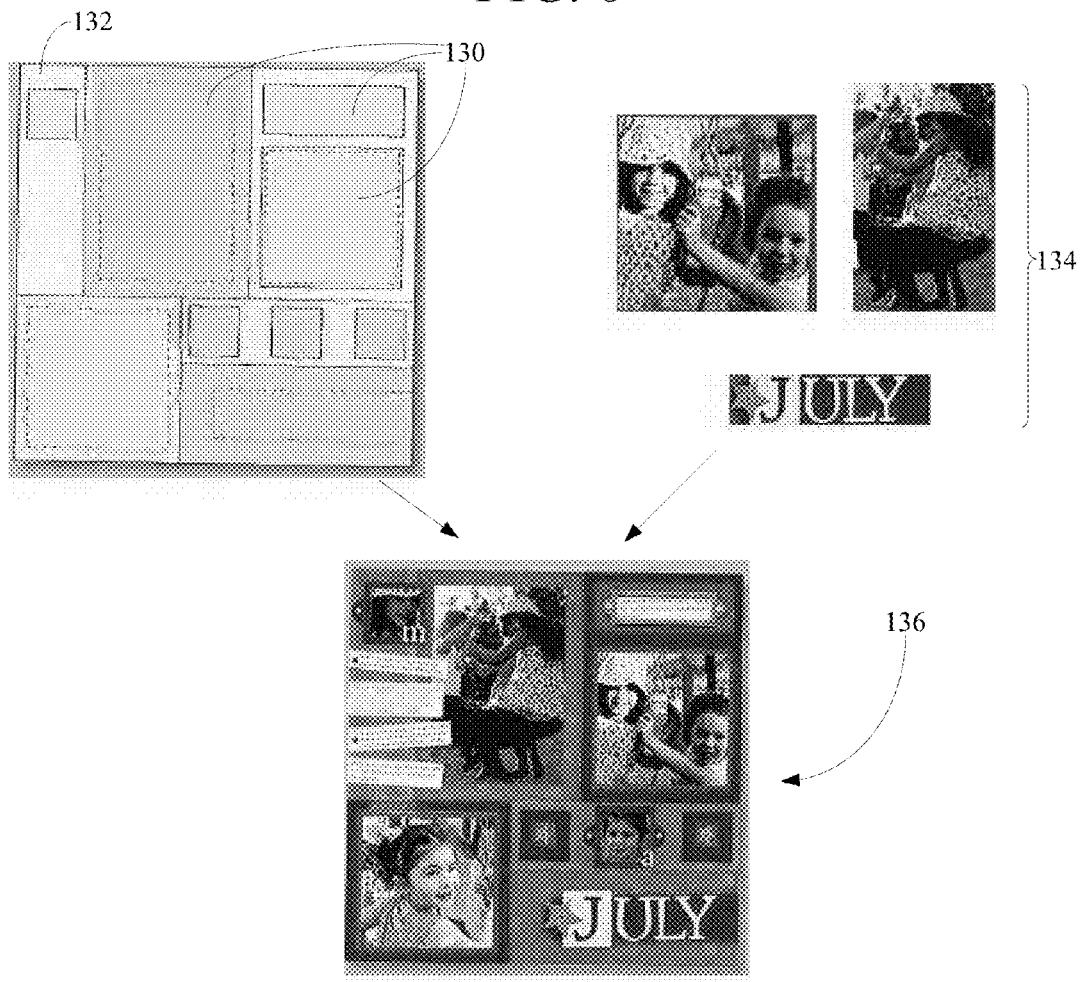
FIG. 7 illustrates another representative template, and an association with various media, such as images and text, to design a representative memorabilia project in association with an embodiment of the present invention.

In FIG. 7, wells 130 can comprise any object, information, or other scrapbooking media (e.g., images, background design, journaling, and titling) that the user wishes to mount or include as part of a completed project 136. The user can rely on the structure and design presented within a page layout template 122 in mounting memorabilia objects, information, and other media 134 within a completed project 136. Memorabilia objects, information, and other scrapbooking media 134 can comprise, as non-limiting examples, many varieties of photographs; statements comprising journal entries or other descriptive text; and images, such as images of stamped or embossed papers, ticket stubs, drawings, montages, newspaper clippings, website printouts, artwork, awards, locks of hair, leaves, sand, tinsel, flowers, mistletoe, etc.

Figure 8:
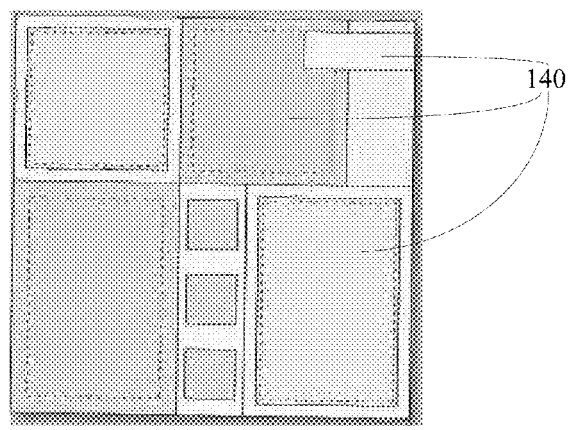
FIG. 8 illustrates another representative template in association with an embodiment of the present invention.

In at least some embodiments, and as shown in FIG. 8, a page layout template comprises a substantially square shape having multiple media-specific wells 140. According to some aspects, a page layout template, as with the illustrated page layout template, is designed so that its structure, functionality, and aesthetic appeal remain when the page layout template is rotated about its center in increments of ninety degrees, while at the same time providing desirable variation as will be further discussed below.

Figure 9:
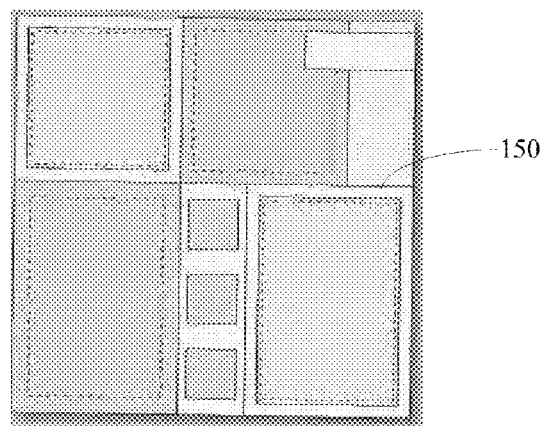
FIG. 9 illustrates a dynamic nature of a template to allow it to be rotationally oriented and associated with media to provide different pages, wherein each page is properly balanced.
Figure 9:
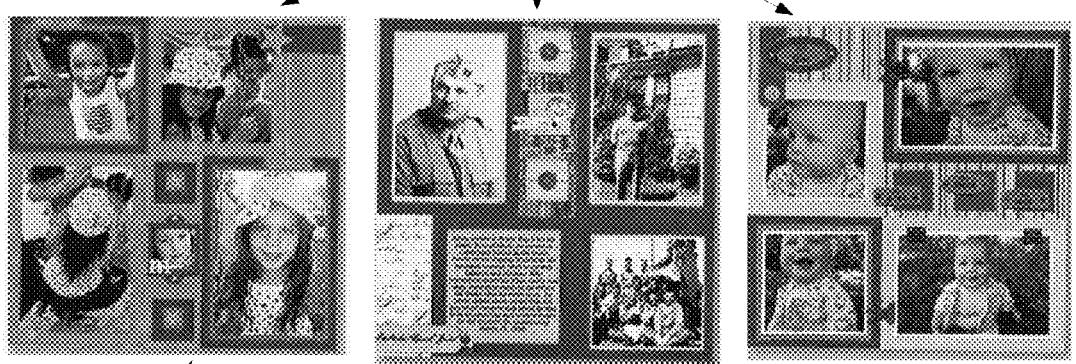

By way of example, FIG. 9 illustrates a page layout template 150 according to one embodiment of the present invention, wherein the page layout template 150 has been used as the basis to create three exemplary instances of a completed design in accordance with the guidance provided by the page layout template 150. In the first completed design 152, the page layout template 150 is used in the same orientation as shown for the page layout template 150 standing alone. In the second completed design 154, the page layout template 150 is used with a rotation of one-hundred-eighty degrees from the orientation shown for the page layout template 150 standing alone. In a third completed design 156, the page layout template 150 is used with a rotation of ninety degrees counter-clockwise from the orientation shown for the page layout template 150 standing alone. In each of the exemplary rotations 152, 154, 156, the functionality of the page layout template 150 remains even when the page layout template is rotated about its center in increments of ninety degrees, while at the same time providing desirable variation. Accordingly, the rotatable template is a guide to creating a workable finished page layout comprising multiple elements.

While a page layout template, according to some embodiments of the present invention, is useful for guiding the user in creating a memorabilia project, many other uses of the same flexible layout template technique will be apparent to those skilled in the art. Examples include, without limitation, templates of a similar manner, wherein the template may be rotated to achieve a variety of structural design effects, such as greeting card templates, photo album templates, gift templates, personal journal templates, slide presentation templates, etc.

In some aspects, embodiments of the present invention may comprise multiple page layout templates used in conjunction with one another, such as, without limitation, a two-page spread as may be found within a scrapbook, photo album, or journal. By providing multiple page layout templates according to the embodiments already described, the flexibility of such embodiments can be increased by providing multiple page layout templates, each of which may be used in multiple rotational configurations with one or more other page layout templates.

Figure 10:
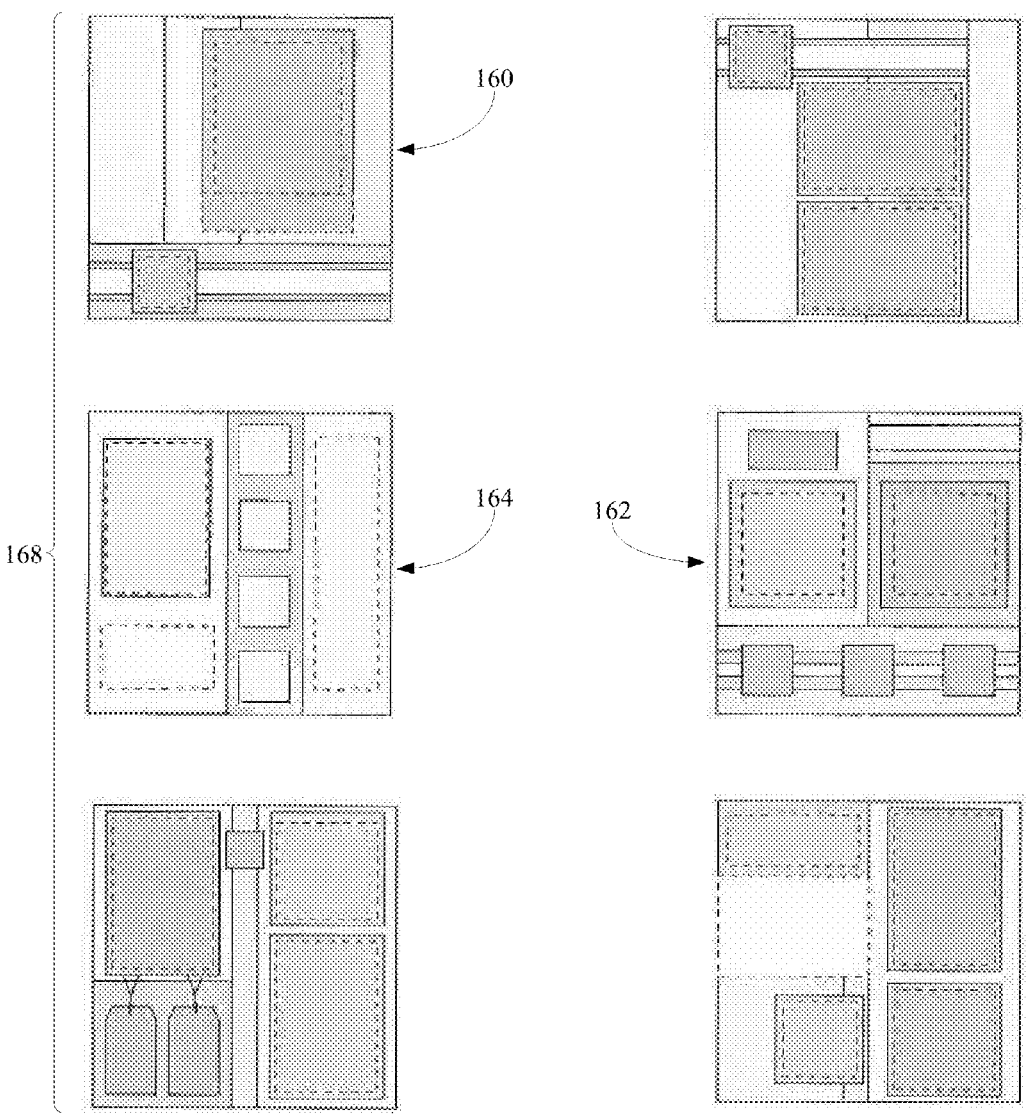
FIG. 10 illustrates a set of page layout templates according to a representative embodiment of the present invention.

According to one embodiment in which multiple page layout templates are provided, as shown in FIG. 10, the user can select a first page layout template 160. The user can then select a second page layout template 164. Accordingly, for example, template 160 can be to the left and template 164 can be to the right in a two-page layout presentation. Each of the page layout templates can be rotated, including, without limitation, being rotated about its center in ninety degree increments.

For a second multi-page layout, the user can reuse one of the previously selected templates (e.g., template 160) and select another page layout template (e.g., template 162) to create a new multi-page layout presentation. Accordingly, for example, template 160 can be to the left and template 162 can be to the right in a two-page layout presentation. Each of the page layout templates can be rotated, including, without limitation, being rotated about its center in ninety degree increments to provide additional variation.

For another multi-page layout, the user can reuse the same templates (e.g., templates 160 and 162) and change the order of the templates. Accordingly, for example, template 162 can be to the left and template 160 can be to the right in a new two-page layout presentation. Again, each of the page layout templates can be rotated, including, without limitation, being rotated about its center in ninety degree increments to provide additional variation.

Thus, the user can effectively swap any page layout template for any other page layout template from a given collection 168 of page layout templates constructed according to embodiments of the present invention. In accordance with further embodiments, the user can selectively rotate each selected page layout template to a desired configuration prior to or during use as part of a specific user-initiated project.

Because the wells remain static within the template so as to rotate as the template rotates, the ability to rotate the templates allows the user to rotate a single template into at least four orientations. As a result, the user can easily vary the appearance of a layout by simply rotating the template without losing the composition, balance, or design integrity of the layout.

In some embodiments, a page layout template is provided in a square configuration to simplify the use of a rotated page layout template within a physical structure, such as an album, in which completed projects based upon one or more page layout templates are retrained by the user. In one embodiment, page layout templates comprising 12"×12" designs are used. Those skilled in the art will appreciate the embodiments of the present invention embrace a variety of shapes, configurations, and/or sizes, including larger than 12", and/or smaller than 12".

The features and techniques discussed thus far demonstrate that a relatively small number of page layout templates provided according to the aforementioned embodiments may result in a very large number of structurally usable page layout templates for end-user projects, thus providing greatly increased flexibility to the creative efforts of the user of such page layout templates, while nevertheless providing sufficient guidance so as to enable users who are less skilled in layout or page design to prepare competent finished projects.

Figure 11:
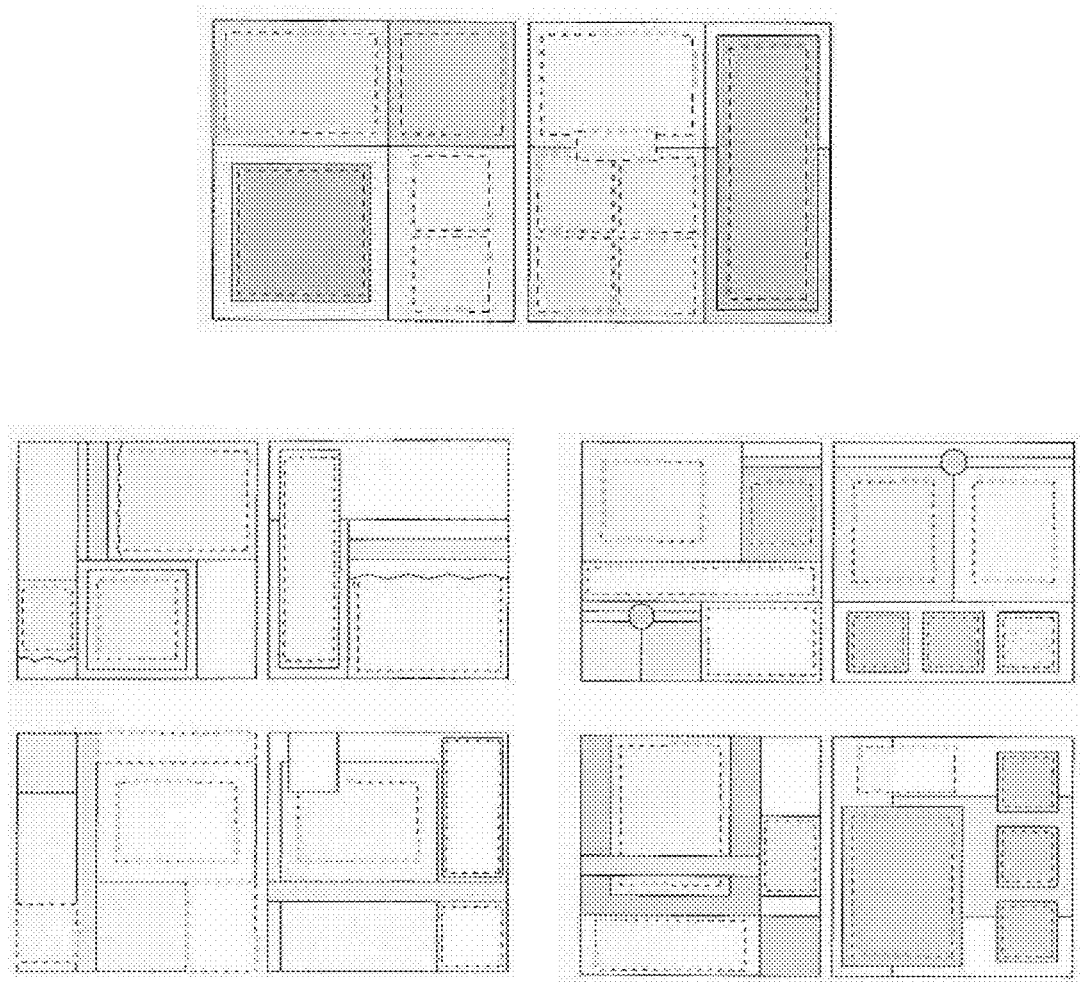
FIG. 11 illustrates a set of two-page layout templates according to a representative embodiment of the present invention.

As an example of the foregoing, consider a collection of five two-page layout templates 170 as illustrated in FIG. 11, where the user wishes to avoid repeating the same layout on any of ten pages within a planned project. If used in a static manner—without rotation and without swapping templates of the two-page layout to other two-page layouts—the total number of possible configurations for the finished project may be calculated according to this formula: 5×4×3×2×1, where the first two-page spread may be selected from any of five possible static two-page layouts, the second two-page spread may be selected from any of the four remaining static two-page layouts, and so forth. The resulting formula yields 120 possible configurations to which the user may apply his or her creative skills.

If, however, the techniques disclosed herein are used with page layout templates constructed according to some embodiments of the present invention, wherein each page of a two-page spread may be selected individually from all ten available pages in the provided project, and wherein each such selected page may be rotated to any of four rotational configurations (e.g., 0, 90, 180, or 270 degrees), then it is apparent that the user may select from 10×4 possible configurations for the first page of the first two-page spread, (10×4)−1 possible configurations for the second page of the first two-page spread (assuming for purposes of this illustration that no configuration is to be repeated), (10×4)−2 possible configurations for the first page of the second two-page spread, and so forth for all ten pages. Thus, the formula to calculate the possible configurations that may be constructed using the five two-page spread page layout templates when constructed according to the embodiments discussed will be 40×39×38×37×36×35×34×33×32×31. The resulting total possible configurations are more than $3 \times 10^{15}$. Yet, as discussed above, this increase in creative possibility for users of the disclosed system is provided within a framework in which a page layout template is provided to guide the implementation of a project, so that beginning users or those unfamiliar with principles of sound design may rely on the page layout templates as formatting guides.

One method of using the present invention comprises the following:

A set of multiple page layout templates is provided, wherein each page layout template is designed and constructed in a manner that permits it (i.e., any wells) to retain its design soundness and structural functionality when used in multiple rotational configurations, including, without limitation, rotational configurations at increments of ninety degrees.

The user selects a first page layout template and determines a rotational configuration in which that first page layout template will be used.

The user optionally selects a second page layout template to create a two-page spread with the first page layout template, and determines a rotational configuration in which that second page layout template will be used.

The user mounts memorabilia, paper, titling journaling, and/or other media in a design corresponding to the page layout templates as previously selected.

In some embodiments, a page layout template is provided as a usable instantiation, such as a pre-printed paper intended for use within a photo album or scrapbook. In other embodiments, a page layout template is provided as an illustration within an instructional guide, where the user may refer to that illustration, including, without limitation, the measurements of the illustration or provided adjacent to the illustration, in order to independently construct a page based upon the information provided in the page layout template.

In at least some embodiments, rather than storing all of the pixels of an end-user's fully designed pages, the system stores a compact, text-based description of a page that references the layouts and embellishments with the user's images. Thus, in such embodiments, there is no need to store a copy every pixel of a particular background design with the user's layout. The images in the project can also be referenced in multiple layouts in the same way. Since the data storage requirements in a high-volume online scrapbooking service could become overwhelming, this approach is more economical and manageable. The final high-resolution pixel-by-pixel image is only generated when an order is placed for professional printing and is discarded one the job is complete.

With reference back to FIG. 3, box 90 shows that once the elements of boxes 80-88 are performed, the user can further personalize the project. Indeed, the user can personalize and customize the project in any suitable manner. In one example, the user is allowed to personalize the project by rotating and/or swapping templates. In some embodiments, when the user rotates a template, any media (e.g., image) that is contained in one or more of the template's wells (e.g., image wells) maintains original orientation of the media (e.g., stays right side up) while being reshaped and/or resized to fit within the new orientation of the media's original wells.

For example, where a template contains a photo in a rectangular image well that is oriented so that the length of well runs vertically in the template and the template is then rotated ninety degrees, the photo will retain its original orientation (e.g., stay right side up) but will automatically be cropped and resized to fill the rectangular well that now has its length running horizontally in the template. To further this example, another well in the template can be configured to have the orientation of the media within the well rotate with the well. For instance, where a background well comprises an image of paper with vertical striping and the well is rotated ninety degrees, the striping of the virtual paper will run horizontally.

In another example, the user personalizes the layout by zooming into or out from an image (e.g., a photo) in the page. In this example, the user can zoom in or from the image in any suitable manner. For instance, the user can zoom into or out from a particular portion of a photo while the described system maintains the photo's original outer dimensions. By way of explanation, as the user zooms in on a portion of a photo having the original dimensions in the template of 1"×1", the desired portion photo is enlarged to fill the original 1"×1" image well in the template.

In a similar example, the user can modify a piece of media (e.g., a photo) on a page in any other suitable manner. For instance, the user can crop, rotate, reduce redeye, add a mat, modify colors, or otherwise alter particular piece of media. In instances in which the user crops a piece of media, the cropping may be accomplished in any suitable manner. By way of example, the user can crop a photo so that the cropped portion is automatically resized to have the same dimensions in the template as did the original photo from which the cropped portion was taken. Additionally, where the user chooses to modify an image's colors, the colors can be modified in any suitable manner, including, but not limited to, being changed to sepia or a black and white color scheme.

In still another example of how the user can personalize a project, the user can alter text (e.g., titling and journaling) in the project in any suitable manner. For instance, the user can adjust the font face, font size, font color, justification of the text, or otherwise modify the text as desired.

Although in some embodiments, the user is allowed to alter the text in virtually any suitable manner, in other embodiments, the user is only allowed to make changes that are selected from within defined limits of the system. For instance, in some embodiments, the users is only allowed to select a text feature (e.g., font face, font size, etc.) from a collection of text features that have been selected by a professional artist to compliment a particular kit. In such instances, the systems are designed to help even novice users produce professional looking layouts.

In still another example, the user is allowed to add embellishments to the layout. In this example, the user can add any type of image to the page that acts to accentuate, decorate, or otherwise embellish the page. For instance, the user can add images of ribbons, bows, photo corners, shapes, drawings, objects, characters, icons, etc. to one or more pages of the project. In some embodiments, only certain well types are capable of receiving embellishments. In other preferred embodiments, however, the user is able to add embellishments to any type of well or class within a template. For instance, while the user may not be able to place text in an image well, the user would still have the option to place one or more embellishments into the image well. Thus, the user can add additional decoration to a well, regardless of the well's type or class.

Where the user is able to add embellishments to the layout, the user can select the embellishments from any suitable location. In one example, the user selects the embellishments from a collection of general embellishments. In another example, however, the user selects embellishments from a kit specific collection, which was selected by a professional artist for a particular kit (e.g., a wedding kit). In this example, the kit-specific collection of embellishments may make it easier for the user to produce a professional looking project that has an easily perceivable theme throughout the layout.

In yet another example, the user can personalize the layout by virtually distressing the page(s) or portions thereof (i.e., particular wells, page surfaces, page edges, etc.). In this example, the user can use the system to make portions of the project appear distressed in any suitable manner, including, but not limited to, ink, paint, and tool distressing. For instance, the user can cause selected edges of the layout to have distress marks that appear to have been caused by swiping, cross-hatching, and/or sponging the page with a material containing ink or paint. Similarly, in some instances, the user can cause one or more page surfaces to have virtual ink/paint distressing that appears to have been caused by a paint brush, a swipe across a page with a material (e.g., suede or a stubble brush) having ink/paint disposed therein, or through another similar manner. In still other instances, the user can cause the edges and/or surfaces of one or more pages in the layout to appear distressed by scissors, sandpaper of various grits, or through the use of another tool.

As a final example of how the end-user can personalize the layout and as discussed above with respect to boxes 86 and 88 in FIG. 3, the user can alter the previously chosen palette by deviating from the default or chosen design and color palette by swapping out the selected papers with any of the kit's available papers. For instance, the user can choose to swap out a selected paper with a cardstock or vellum of a different color, texture, or other feature.

As the user personalizes one or more pages in the layout of a particular project, the user can undo specific changes as desired. For instance, in some embodiments, the user can undo distressing changes while leaving other changes, such as rotation, unaffected. Moreover, in some embodiments, the user is also allowed to reset the layout to a default setting (e.g., a setting in which the template is in its original orientation, the layout is free from distress marks, etc.).

In some embodiments, the user's changes made to a particular page in the project are specific to that particular page on which they are made. In other embodiments, the changes that the user makes to one page will automatically propagate to other pages of the layout. For instance, where the user chooses to distress a page, change a specific font face, and/or otherwise personalize a page, the user's changes will be propagated to the other pages of the project. This propagation can be accomplished in any suitable manner, including by propagating changes throughout wells of same type or wells of both the same type and class. This propagation feature helps to the user to easily create a visually pleasing layout that has a consistent scheme throughout.

Referring back to FIG. 3, box 92 shows that once the user is satisfied with the appearance of the layout or album, the user can choose to have the virtual layout or project rendered into a physical form. At this point, the user can have one or more projects rendered in any suitable manner. Indeed, in some embodiments, the user purchases the project online. In such embodiments, the user places any desired projects into a virtual cart, cobbling the projects together as the user desires. For instance, the user can add individual two-page spreads or entire albums to the cart. The user can also choose the quantity of each project that the user wants rendered. Furthermore, in some instances, as the user purchases one or more projects, the user is also given the option to purchase related physical products, such as album covers, page protectors to store the user's pages, embellishments (e.g., buttons, ribbons, etc.) to add to a printed project, etc.

In some embodiments, the user is able to choose the manner in which the selected layouts or projects are physically rendered. For instance, in some embodiments, the user is able to print one or more projects out on a printer that is directly accessible to the user. In other embodiments, the user is able to view and allow others to view the project on-line. In still more preferred embodiments, however, the user selects to have one or more projects professionally rendered. In such embodiments, the professionally printed pages can have a higher level of quality than may otherwise be available to the user.

Where the pages are professionally rendered, the user can obtain the physical pages in any suitable manner. In one example, the professionally rendered projects are sent (e.g., shipped) to an address provided by the user. In another example, the professionally rendered projects are made available to the user through a brick and mortar retailer.

While the described systems and methods may be embodied and implemented in any suitable manner, FIGS. 12 through 27 illustrate a series of screen shots that depict one representative embodiment of a method for dynamically generating graphical memorabilia projects for presentation and use.

Figure 12:
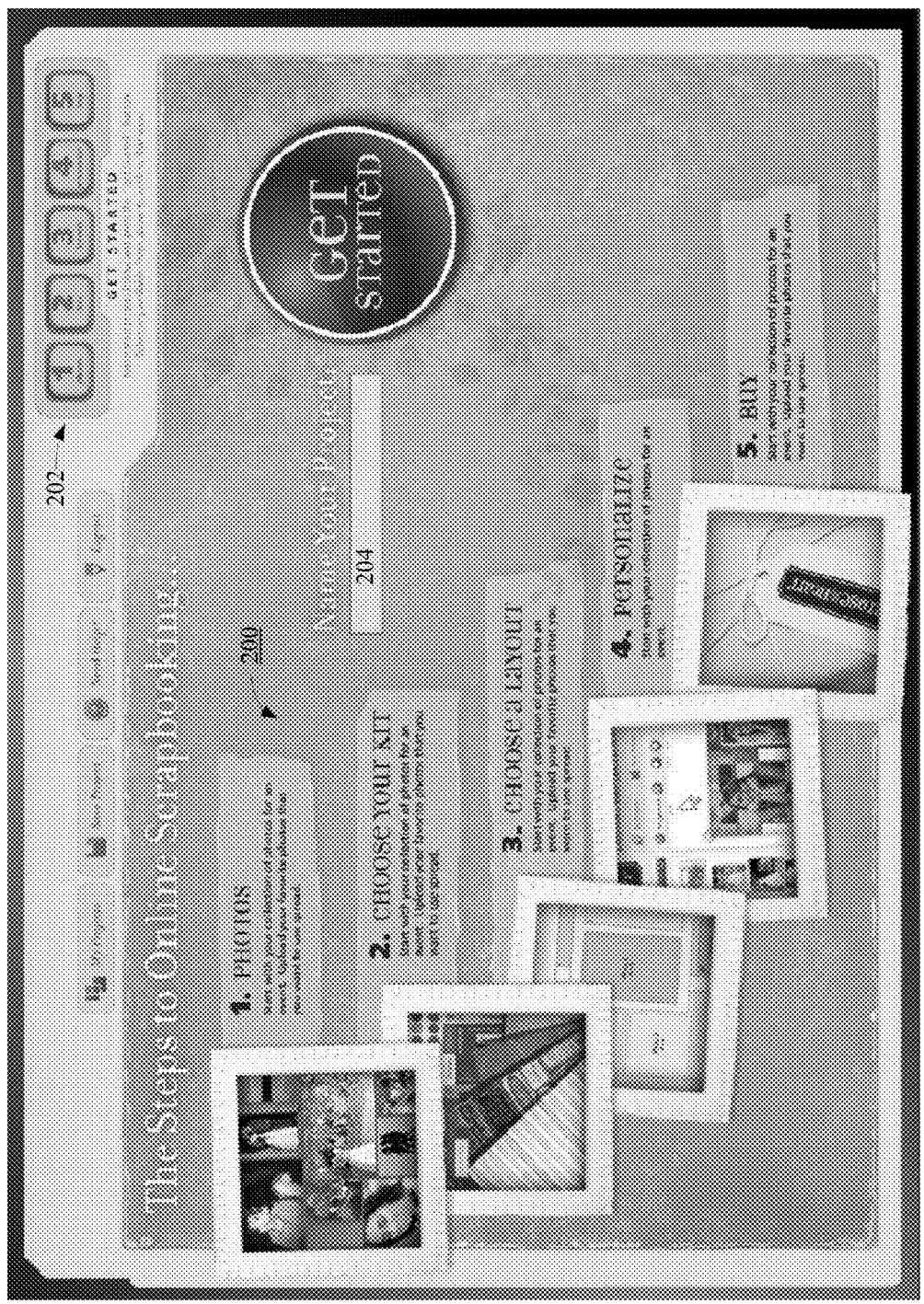
FIGS. 12-27 illustrate a representative series of screen shots that illustrate a representative manner of dynamically generating graphical memorabilia projects for presentation and use.

In particular, FIG. 12 shows a representative embodiment of a page that provides an overview of one embodiment of the described method 200. Specifically, FIG. 12 shows that the current method 200 comprises several options, including 1) uploading and categorizing images (shown in FIG. 3 at box 80), 2) choosing a kit (shown in FIG. 3 at box 82), 3) choosing a template (shown in FIG. 3 at box 84), 4) personalizing the layout (shown in FIG. 3 at boxes 86-90), and 5) buying the rendered project (shown in FIG. 3 at step 92).

Additionally, FIG. 12 shows that the system provides the user with several additional tools. In one example, FIG. 12 shows that the displayed page comprises a tool bar 202 that allows the user to skip through the various features (e.g., 1-5) of the process, in any suitable order. In another example, FIG. 12 shows that where the user is beginning a new project, the method 200 allows the user to provide the project with a name 204.

Figure 13:
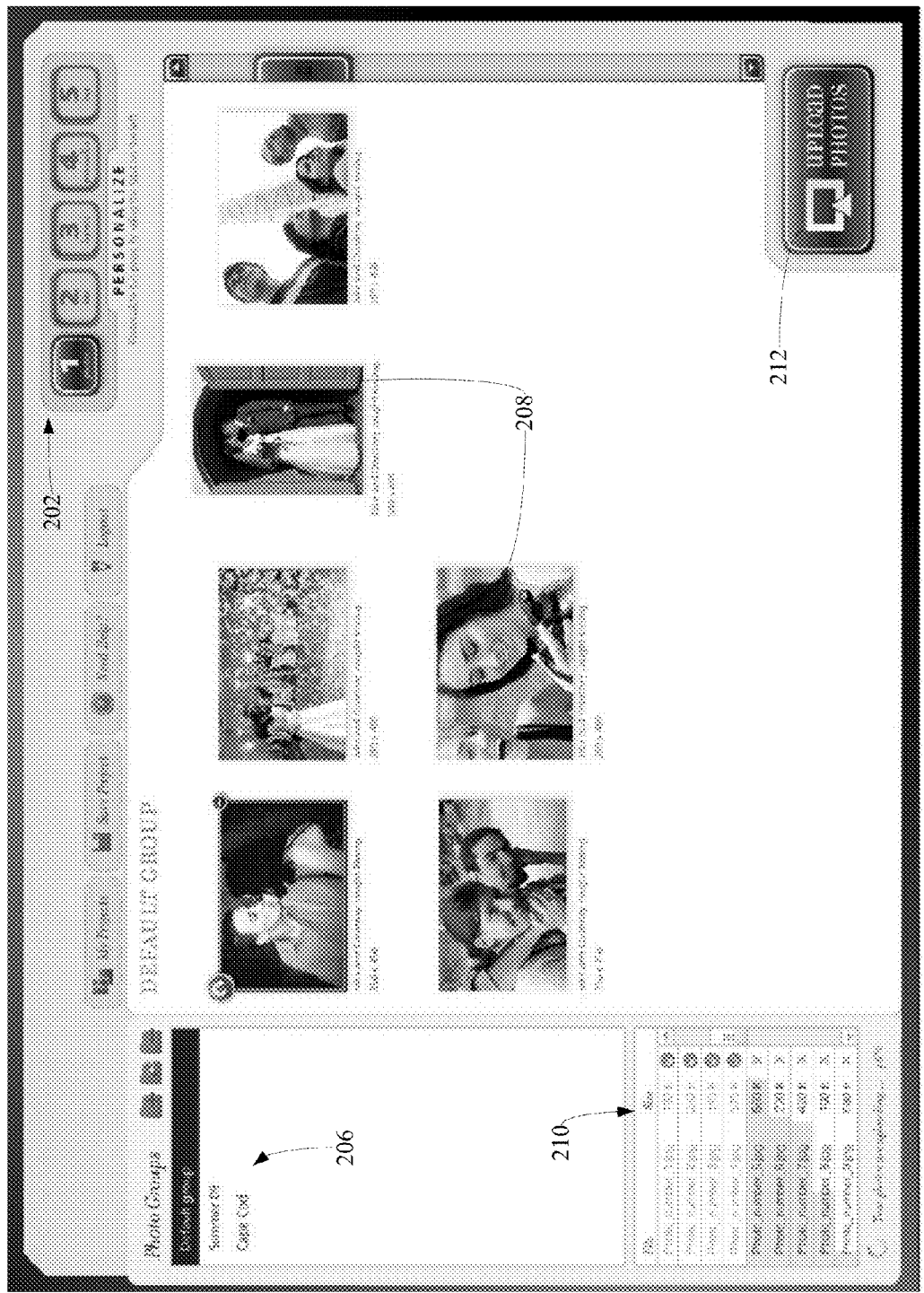

Referring to FIG. 13, that Figure illustrates that, in some embodiments, option 1 (as indicated by the tool bar 202) allows the user to organize images into a variety of categories or groups 206, view images (e.g., as thumbnails 208), obtain image information 210, and upload additional images through an upload tool 212.

Figure 14:
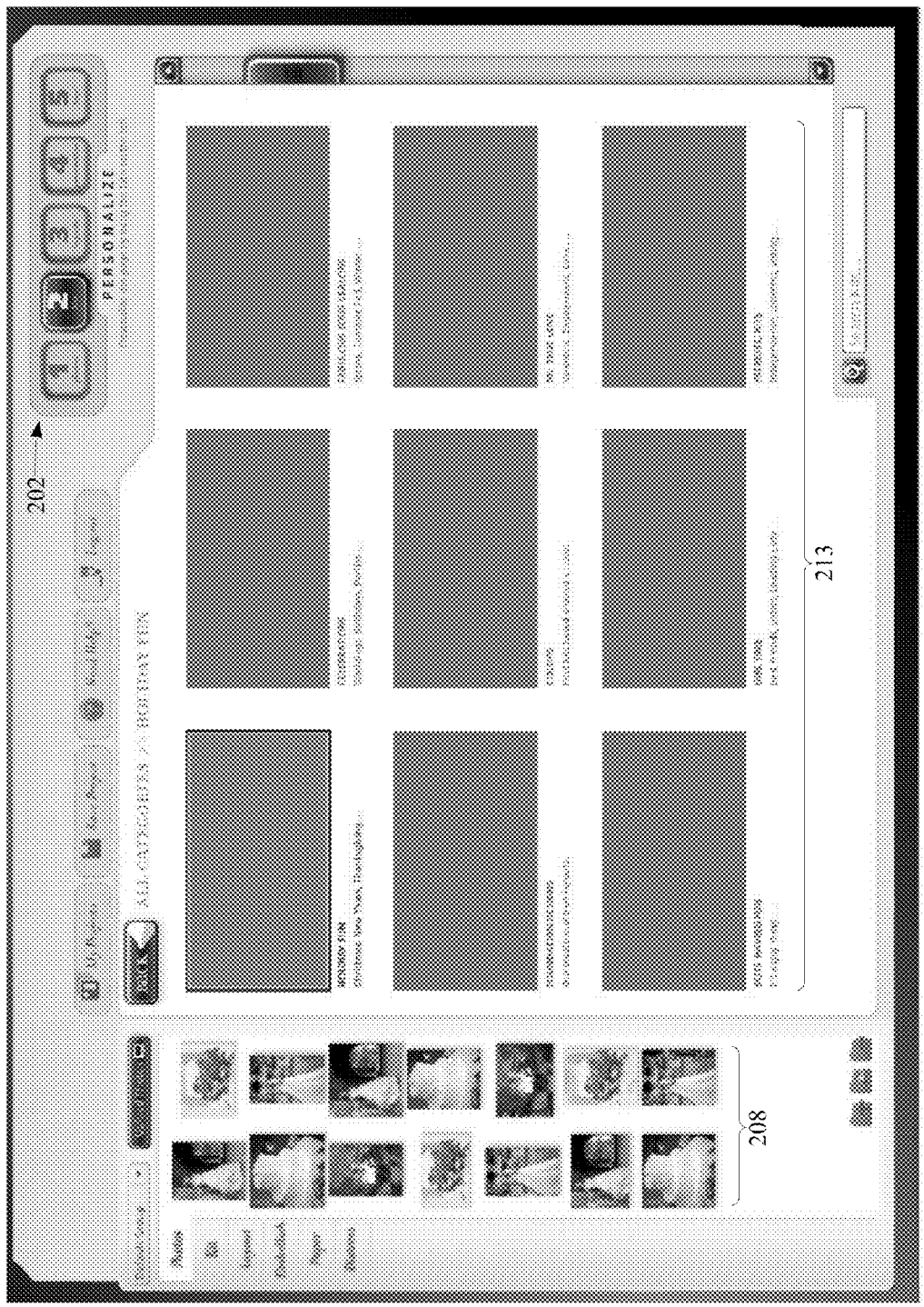

FIG. 14 shows that in option 2, while the user is able to view thumbnails 208 of a variety of images that were selected in option 1, the user is also able to select a theme for the project by choosing a design kit from a variety of themes (e.g., a kit with a theme of "Baby", "Celebration", "Family", "Heritage", "Holiday", "Outdoors", "Feminine", "Masculine", etc.).

Figure 15:
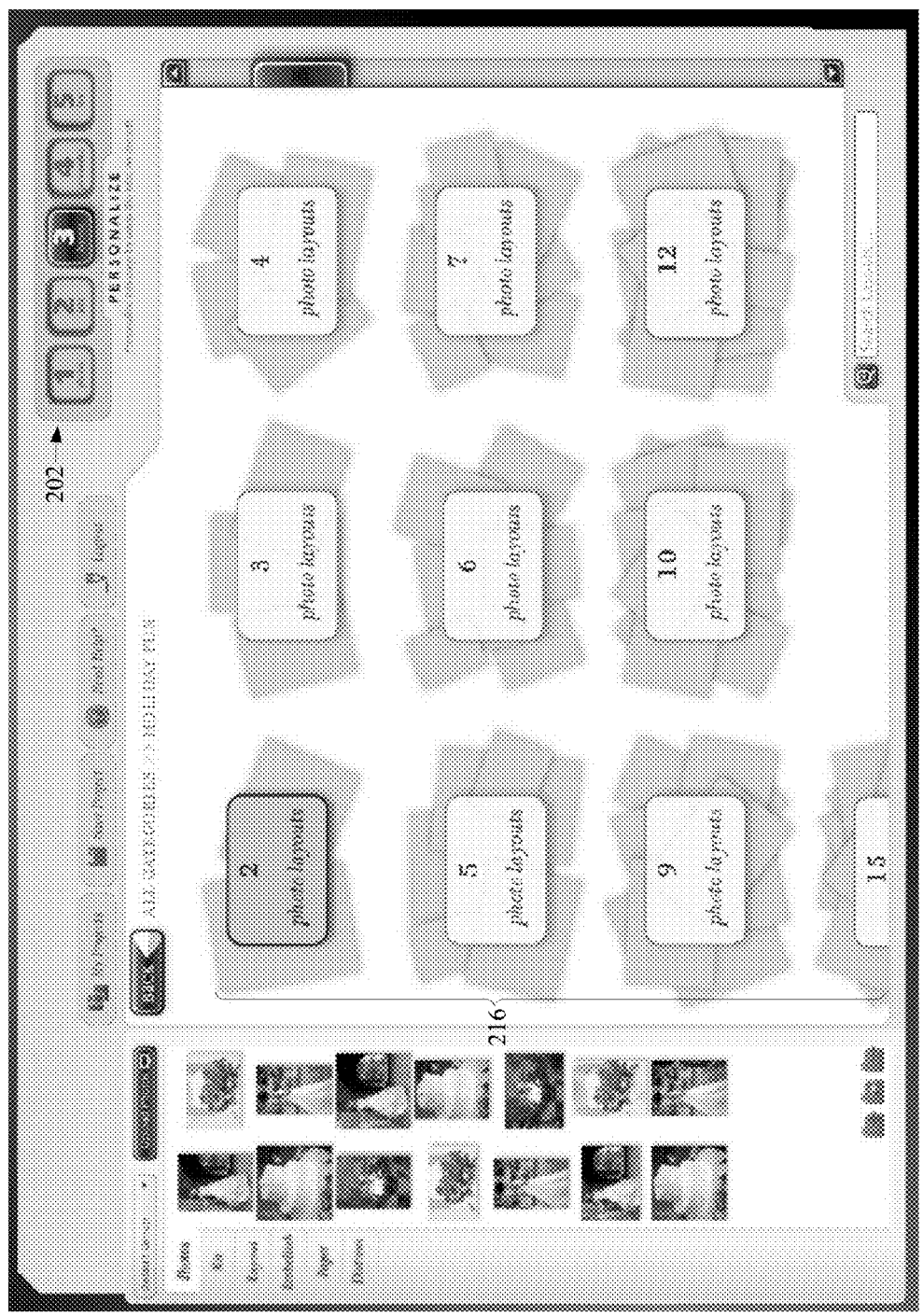
Figure 16:

FIG. 15 shows that in option 3, the user is able to select a page of layouts 214 from the album 216. After selecting a specific page, FIG. 16 shows that the user can use the arrows 218 and 220 to scroll through a variety of different dynamic page layout templates and paper combinations. When the user finds a desired template and background design combination, the user can click or otherwise engage the select button 222 to apply the selected template and background design to the particular page of layouts that the user selected in FIG. 15.

Figure 17:
Figure 18:
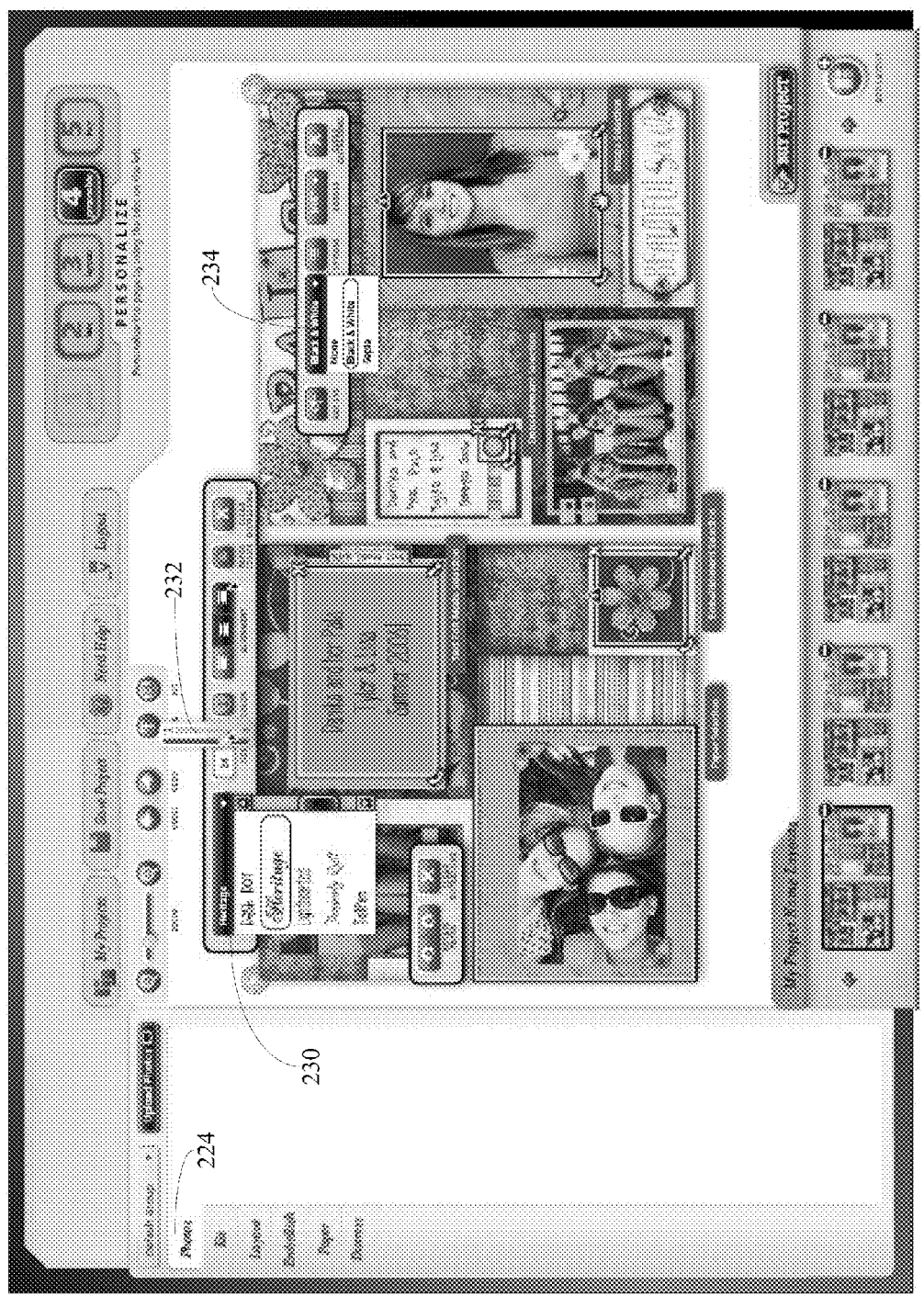
Figure 19:
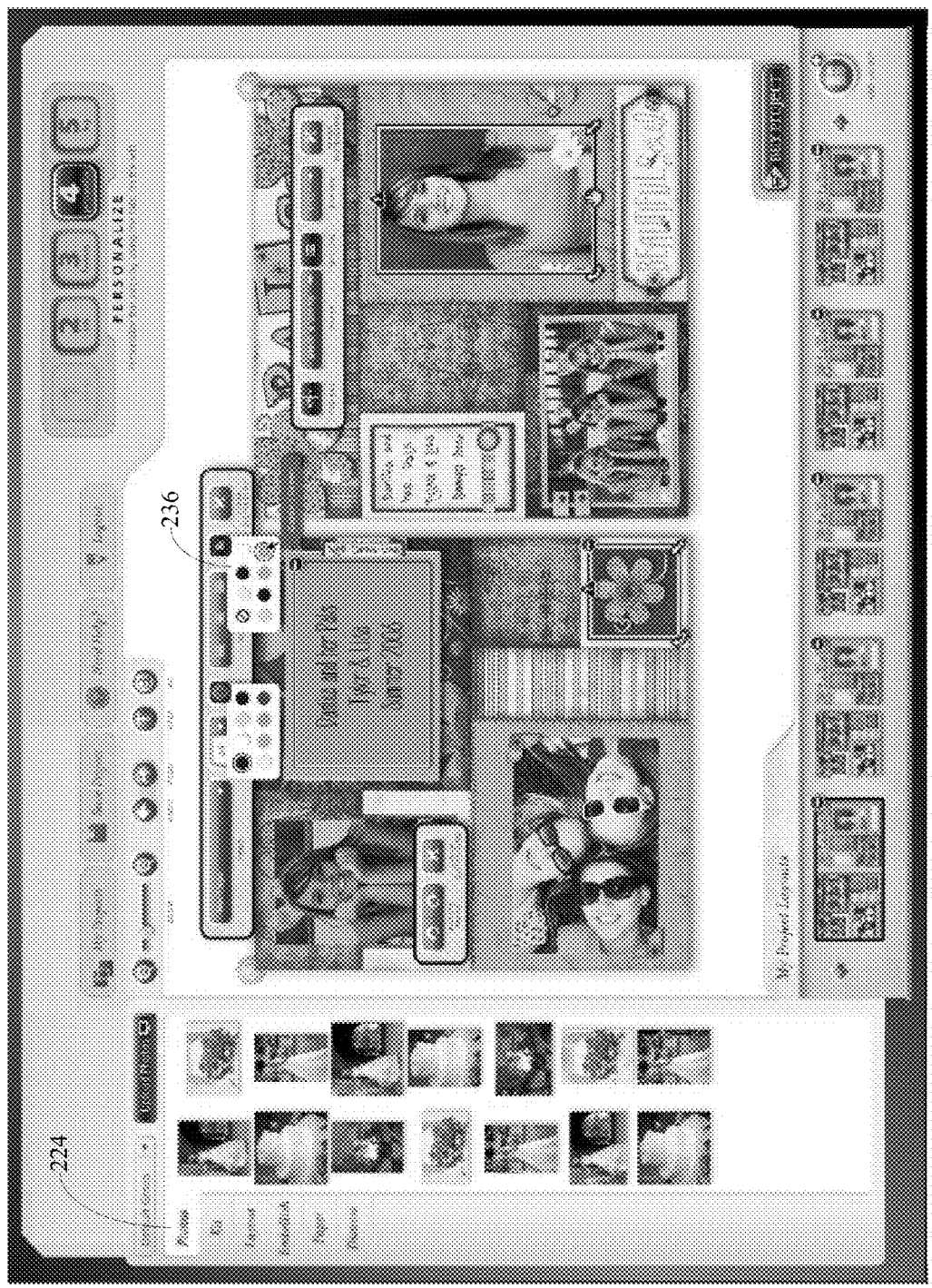

In option 4, FIGS. 17 through 19 show that the user can select a photo personalization tab 224 to allow the user to personalize and customize the template and images disposed therein. Specifically, FIG. 17 shows that the user can select one or more arrows 226 to rotate one or more pages in the project. Additionally, FIG. 17 shows that the user can use a zoom tool 228 to zoom into or out from a particular image, as discussed above.

FIG. 18 shows that in the photo personalization tab, the user can further use a font face tool 230, a font size tool 232, and a photo color tool 234 to change the font face of a text, the font size of a text, and the coloring of a photo, respectively. Similarly, FIG. 19 shows that the user can utilize a font color tool 236 to change the color of a text in the layout.

Figure 20:
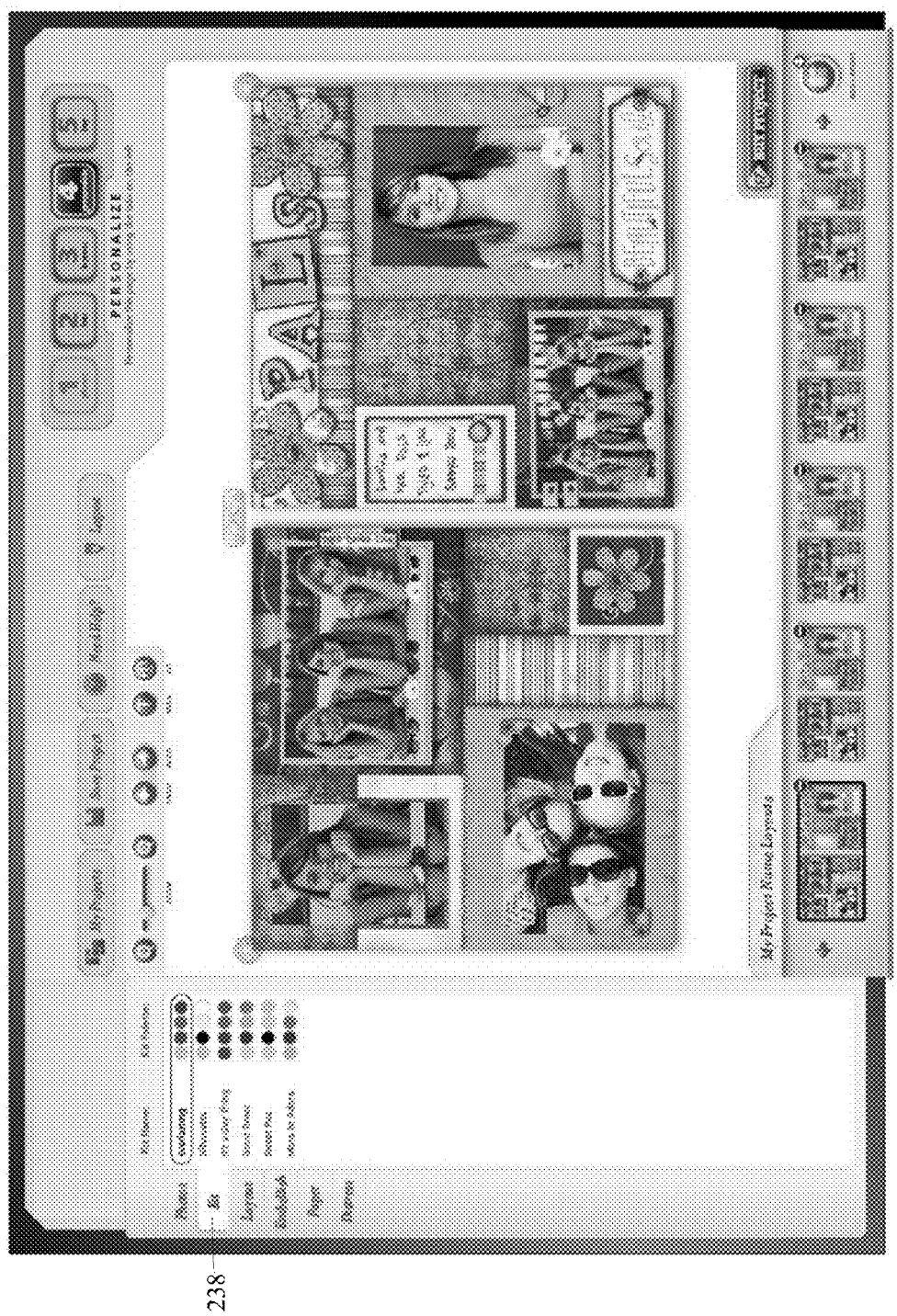

With reference to FIG. 20, that Figure shows that in option 4, the user can use a kit tab 238 to choose a different kit and design and color palette for a particular template than was provided for that particular template in option 2.

Figure 21:
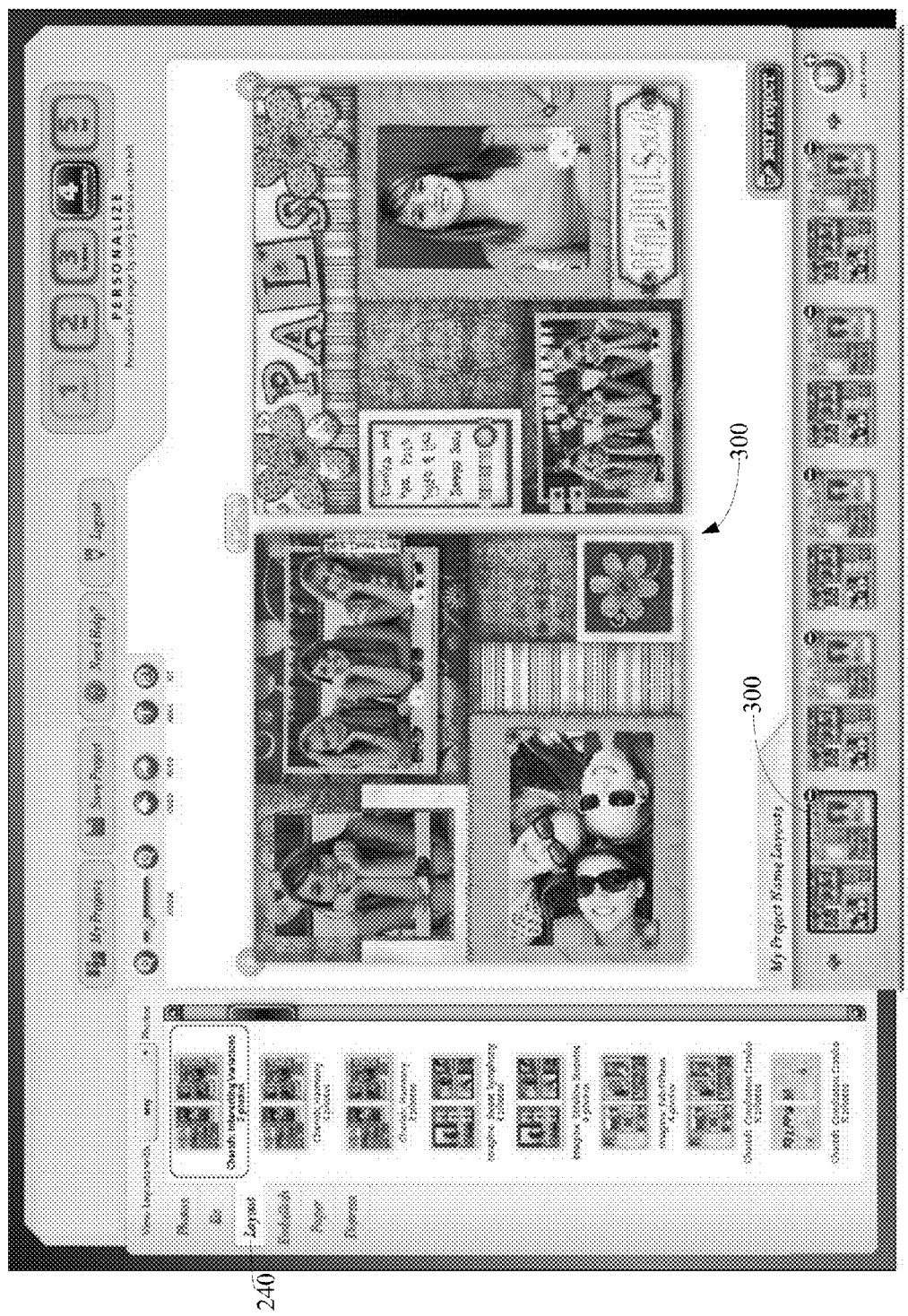

FIG. 21 shows that in option 4 the user can also use a layout tab 240 to select a different dynamic page layout template for a particular layout 300 than the user originally selected in step 3.

Figure 22:
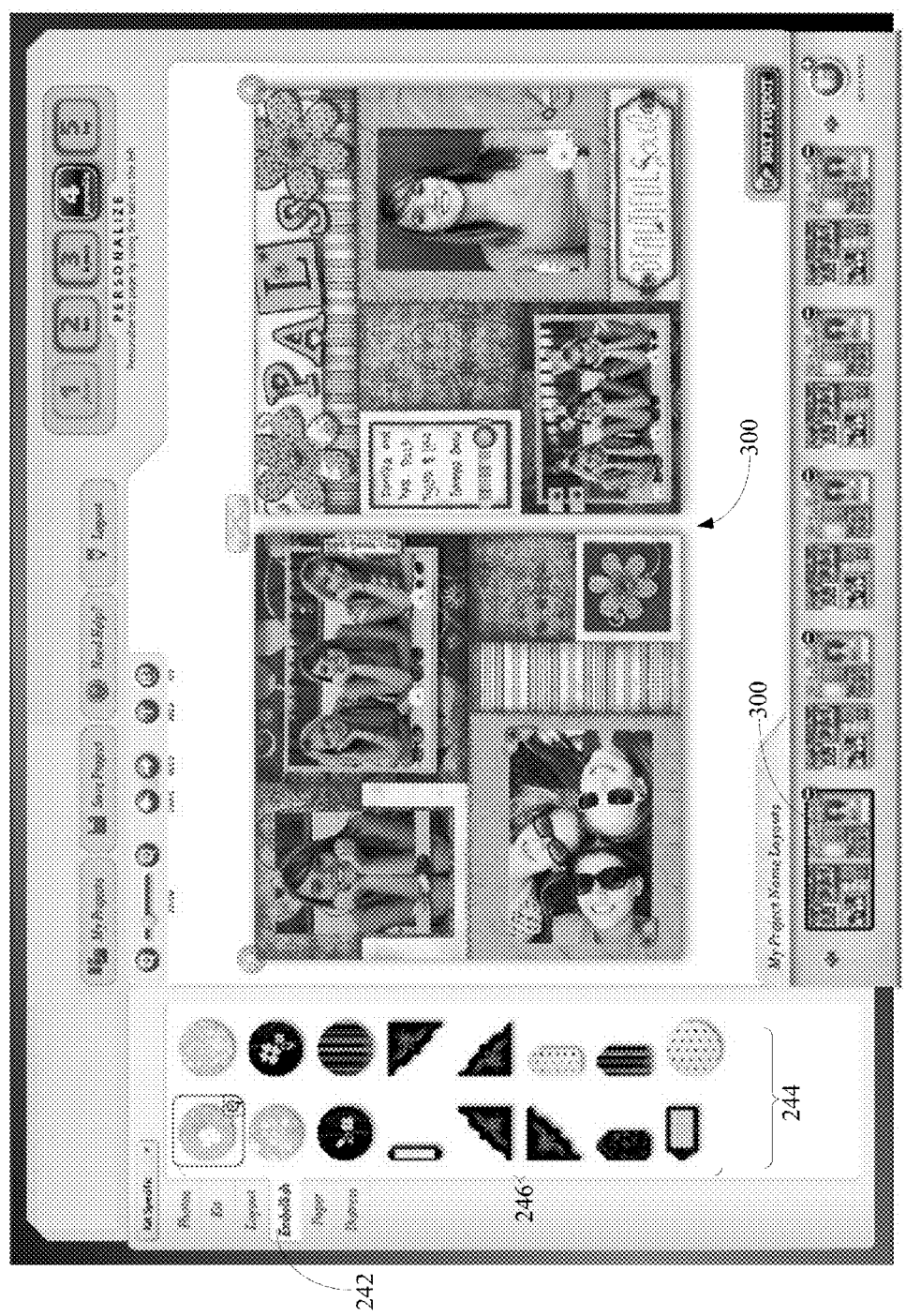

FIG. 22 shows that in step 4, the user can further customize a particular layout 300 by using an embellishment tab 242 to add one or more of decorations or other embellishments 244 to the layout. While such embellishments can be added to the project in any suitable manner, FIG. 22 shows an embodiment in which the embellishments 244 can be dragged from an embellishment tool bar 246 and dropped onto the layout 300.

Figure 23:
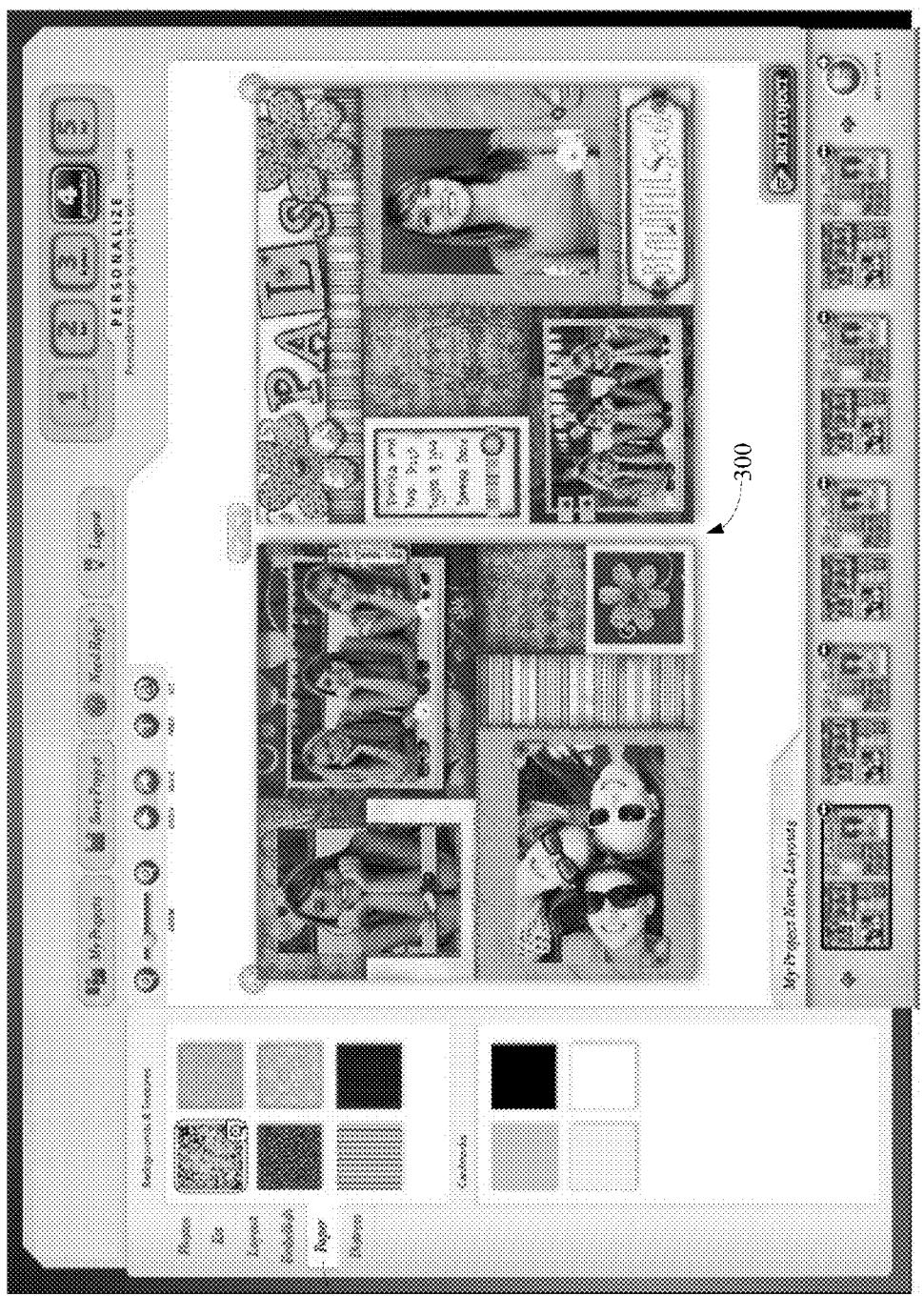

Still another way in which the user can personalize a particular layout is illustrated in FIG. 23. In particular, FIG. 23 shows that the user can select a paper tab 248 to change the appearance, color, texture, etc. of any background design (e.g., image of a piece of paper and/or cardstock) in the layout 300.

Figure 24:
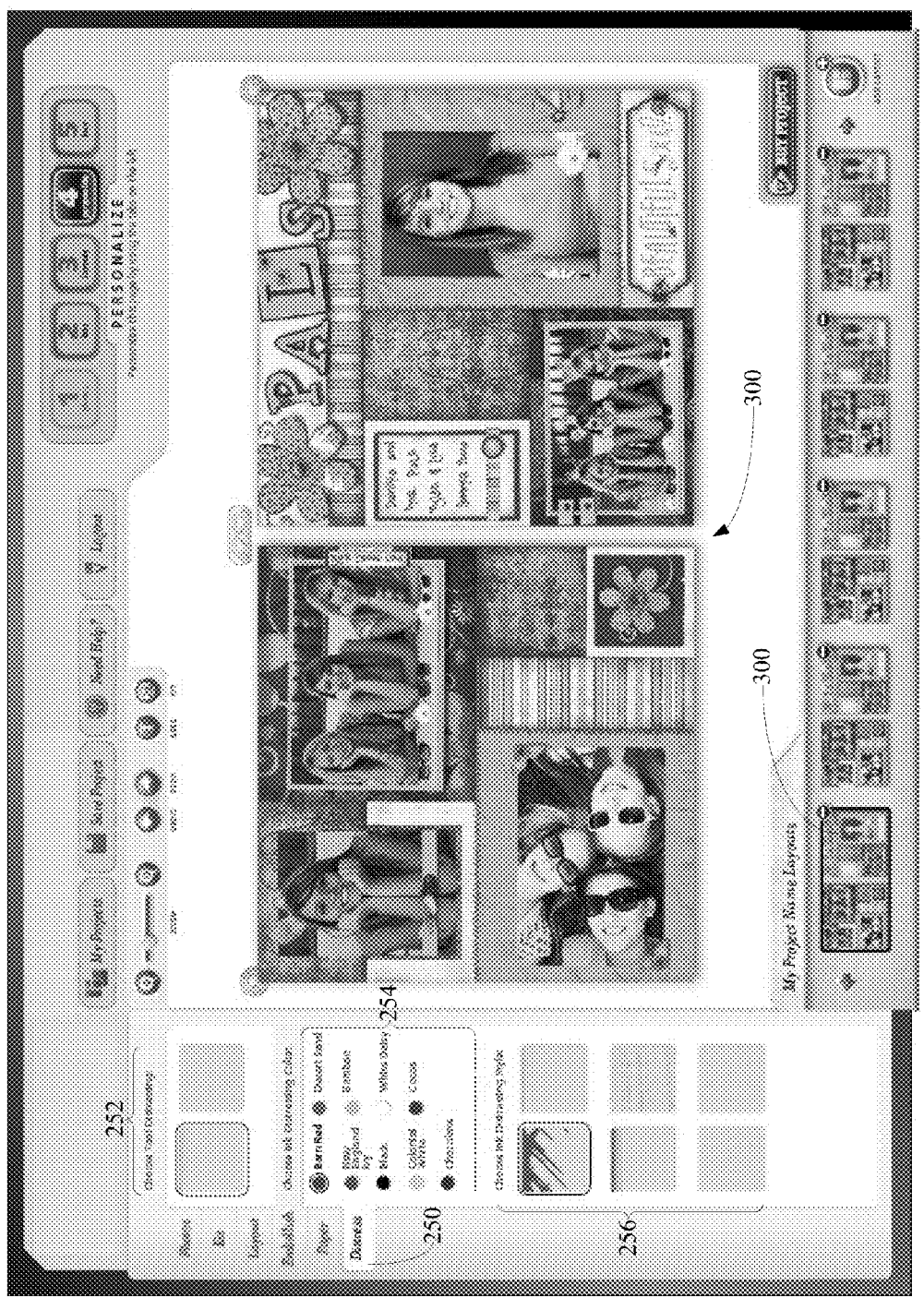

With respect to FIG. 24, that Figure shows that the user can use a distress tab 250 to add customized distress marks to the layout 300. By way of example, FIG. 24 shows that the user can select a distressing tool 252, a distressing color 254, and/or a distressing style 256 to apply to a desired distressed look to the layout 300.

Figure 25:
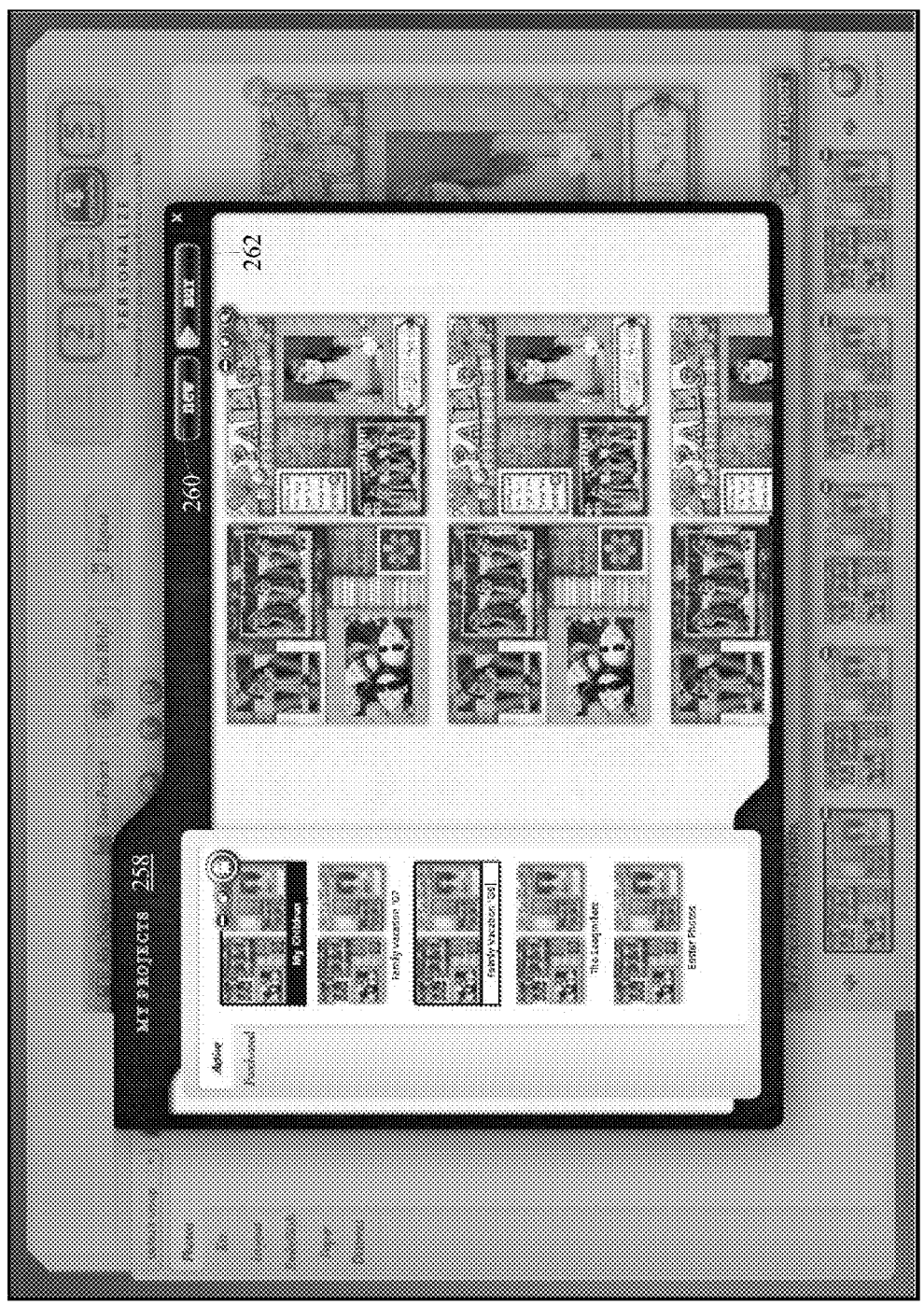

FIG. 25 shows that at any point in the method, the user can select, for example, a "Mmy Projects" tab 258 to allow the user to review any of the user's active or purchased projects. As the user reviews the projects, FIG. 25 shows that the user is given the opportunity to begin a new project by selecting a new tab 260. Additionally, FIG. 25 shows that the user is allowed to progress to step 5 and buy one or more projects by selecting a buy tab 262.

Figure 26:
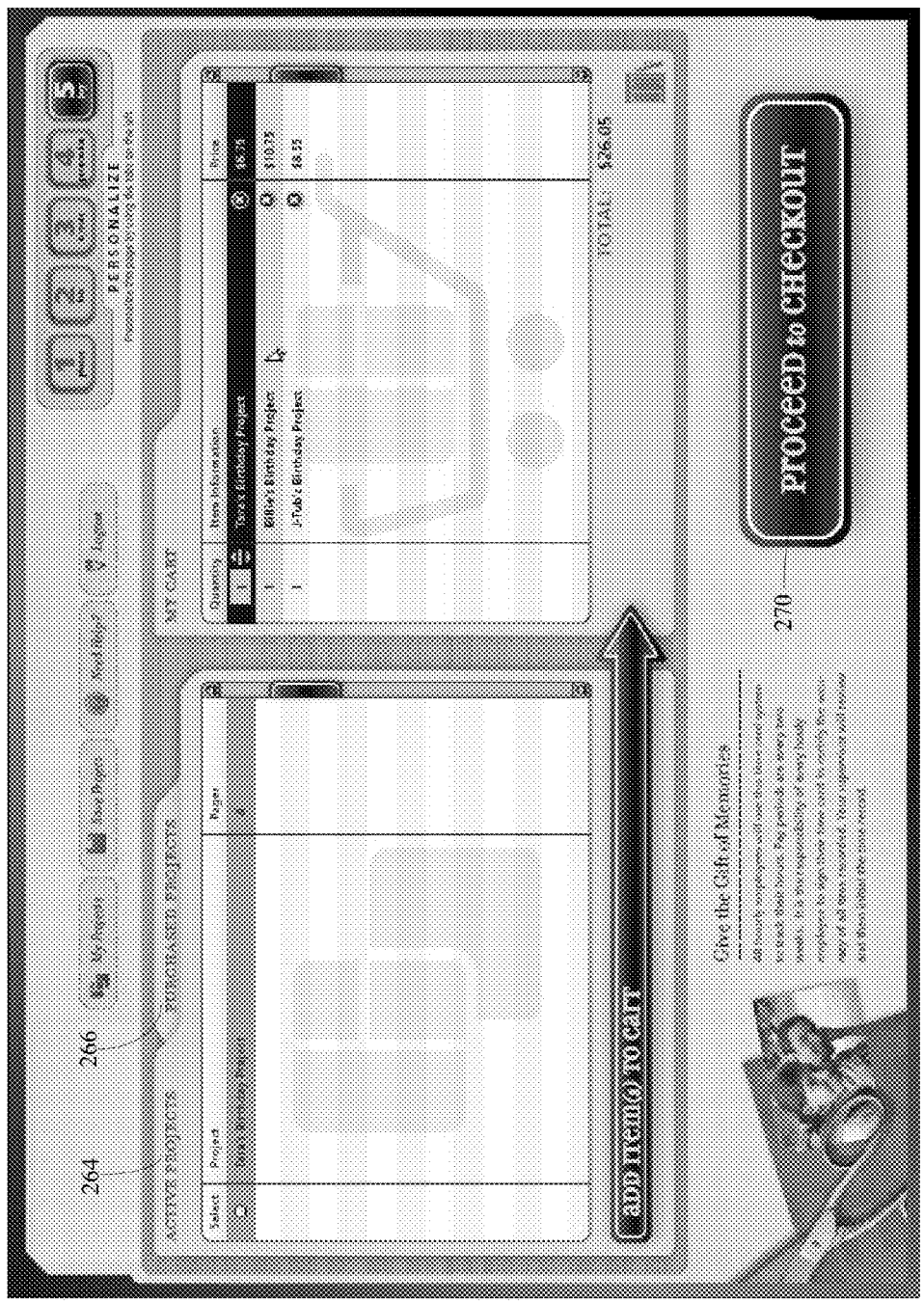
Figure 27:
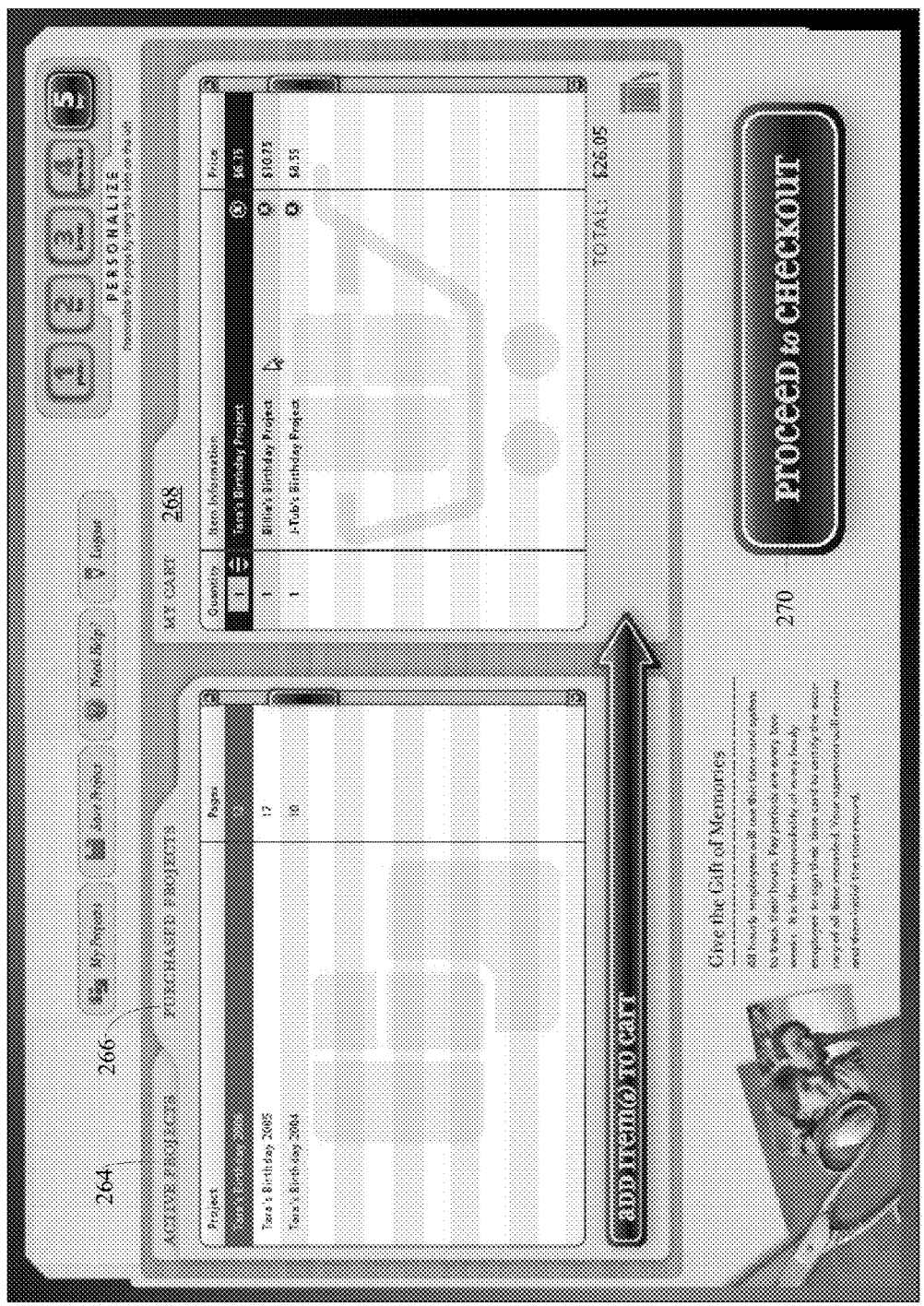

Once the user chooses to purchase a project, FIGS. 26 and 27 show that the user is allowed to select projects from an "Active Projects" tab 264 and a "Purchased Projects" tab 266. As the user selects projects, FIGS. 26 and 27 show that the projects are added to a "My Cart" tab 268, which indicates the cost of rendering the projects into a physical form.

After adding one or more projects to the cart, FIGS. 26 and 27 show that the user can precede to checkout 270, where the user can select the manner in which the user obtains the purchased projects in a physically rendered form.

Thus, as discussed herein, embodiments of the present invention embrace memorabilia storage. In particular, the present invention relates to systems and methods for dynamically generating graphical memorabilia projects for presentation and use in a manner that provides enhanced opportunity for the creative involvement of users and enables even a novice the ability to produce high quality results tailored to their own photos and preferred paper kits.

The identified features, characteristics, functions, and advantages described herein are not meant to be limiting in any way. It is contemplated that one skilled in the art will recognize other apparent features and advantages of the various embodiments of the invention other than those specifically recited, described, or mentioned herein. Therefore, while an embodiment of the invention comprising one or more page layout templates is specifically described, such descriptions are provided with the intention of encompassing like-systems or like-devices or like-methods.

The present invention may be embodied in other specific forms without departing from its spirit or essential characteristics. The described embodiments and examples are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer system for dynamically generating a graphical memorabilia project, the system comprising:
   a computer processor used to generate the graphical memorabilia project, the memorabilia project comprising:
      a dynamic page layout template having a first well of a first well type and multiple wells of a second well type, wherein a first area of the template, which is fixed in location with respect to the template, is configured to accept an image and to prevent a background design element from being placed as a top layer of the memorabilia project in that first area,
      wherein the background design element comprises a virtual design that is configured to resemble a decorative element placed in a physical memorabilia project,
      wherein the first well of the first well type comprises the first area,
      wherein the wells of the second well type are divided into multiple well classes, and
      wherein wells of the second well type that are of the same well class are governed by similar pre-determined rules, such that a change to one of the wells that is of the second well type and of a first well class will cause a similar change to another well of the second well type and of the first well class.

2. The system of claim 1, wherein the wells of the second well type are interrelated in that each is configured to receive its own background design element while preventing another form of media from being disposed therein.

3. The system of claim 1, wherein changes to one of the wells of the second well type of a second well class causes similar changes to another well of the second well type and of the second well class.

4. The system of claim 1, wherein the dynamic page layout template is selected from multiple professionally, pre-designed layout templates.

5. The system of claim 2, wherein one well of the second well type is layered on a portion of another well of the second well type.

6. The system of claim 1, wherein the background design element is selected from a background kit having different background design elements, wherein some of the wells of the second well type are each configured to receive a different background design element, and wherein the background kit comprises multiple design and color palettes that are each selectable to apply the different background design elements to the page layout template in a different, coordinated manner.

7. The system of claim 1, wherein the page layout template comprises multiple wells of the first well type, wherein the wells of the first type are divided into multiple different classes, and wherein a change to one well of the first well type and of a third well class will cause a similar change to another well of the first well type and of the third well class.

8. The system of claim 1, wherein the image comprises a photograph.

9. The system of claim 1, wherein the first well is configured to automatically receive and retain the image in a first orientation when the template is rotated about its center by a rotational amount of 90 degrees, 180 degrees, and 270 degrees.

10. The system of claim 1, wherein the change to the one of the wells that is of the second well type and of a first well class is selected from distressing, rotating media within the well, and changing media color or design of the well.

11. A computer program product for implementing within a computer system a method for dynamically generating a graphical memorabilia project, the computer program product comprising:
a computer-readable, non-transitory medium for providing computer program code means utilized to implement the method, wherein the computer program code means is comprised of executable code for implementing:
providing a dynamic page layout template having a first well of a first well type and multiple wells of a second well type, wherein a location of the first well of the first well type and locations of the wells of the second well type are fixed with respect to the template, wherein the first well will accept an image while preventing one or more background design elements from being disposed therein, wherein each of the one or more background design elements comprises a virtual design that is configured to resemble a decorative element for use in a physical memorabilia project, wherein each of the wells of the second well type will accept an individual background design element, while preventing the image from being disposed therein, wherein the wells of the second well type are divided into well classes, and wherein wells of the second well type that are of the same well class are governed by similar pre-determined rules, such that a change to one of the wells that is of the second well type and of a first well class will cause a similar change to another well of the second well type and of the first well class; and
placing the image in the first well.

12. The computer program product of claim 11, wherein the computer program code means is further comprised of executable code for implementing a step for making a change to one of the wells of the second well type and of a second class, wherein the change to the one of the wells of the second well type and of the second class automatically cause a similar change to another well of the second well type and of the second well class.

13. The computer program product of claim 11, wherein the computer program code means is further comprised of executable code for implementing the step of placing a different piece of the one or more background design elements in some of the wells of the second well type.

14. The computer program product of claim 11, wherein the computer program code means is further comprised of executable code for implementing a step for layering one well of the second well type on top of a portion of another well of the second well type.

15. The computer program product of claim 11, wherein the one or more background design elements are selected from a background kit having different background design elements, wherein some of the wells of the second well type are interrelated in that each will receive a different piece of the one or more background design elements, and wherein the background kit comprises multiple design and color palettes that are each selectable to apply the different pieces of the one or more background design elements to the page layout template in a different, coordinated manner.

16. The computer program product of claim 11, wherein the computer program code means is further comprised of executable code for implementing the step of automatically receiving and retaining the image in a first orientation when the template is rotated about its center by 90 degrees and 180 degrees.

17. A method for dynamically generating a graphical memorabilia project, the method comprising:
using a web-based system comprising a computer-readable, non-transitory medium for providing computer program code means to perform a technique comprising:
providing a dynamic page layout template having a first well of a first well type and multiple wells of a second well type, wherein a first area of the template, which is fixed in location with respect to the template, is configured to accept an image and to prevent one or more background design elements from being placed as a top layer of the graphical memorabilia project at that first area, wherein each of the one or more background design elements comprises a virtual design that is configured to resemble a decorative element to be used in a physical memorabilia project, wherein multiple second areas of the template, which are each fixed in location with respect to the template, are each configured to accept a piece of the one or more background design elements and to prevent the image from being placed as a top layer of the graphical memorabilia project at the second areas, wherein the first well of the first well type comprises the first area, wherein the wells of the second well type comprise the second areas, wherein the wells of the second well type are divided into well classes, wherein wells of the second well type that are of the same well class are governed by similar pre-determined rules, such that a change to one of the wells that is of the second well type and of a first well class will cause a similar change to another well of the second well type and of the first well class; and
placing the image in the first well.

18. The method of claim 17, wherein the technique performed by the web-based system further comprises automatically receiving and retaining the image in a first orientation when the template is rotated about its center by 90 degrees, 180 degrees, and 270 degrees.

19. The method of claim 17, wherein the one or more background design elements is selected from a background kit having different background design elements, wherein some of the wells of the second well type are each configured to receive a different background design element, and wherein the background kit comprises multiple design and color palettes that are each selectable to apply the different background design elements to the template in a different, coordinated manner.

20. The method of claim 17, wherein the technique performed by the web-based system further comprises layering one of the wells of the second well type on a portion of another well of the second well type.

21. A computer program product for implementing within a computer system a method for dynamically generating a graphical memorabilia project, the computer program product comprising:
a computer-readable, non-transitory, medium for providing computer program code means utilized to implement the method, wherein the computer program code means is comprised of executable code for implementing a process comprising:
receiving user input relating to a selection of:
multiple dynamic page layout templates comprising a first dynamic page layout template and a second dynamic page layout template that each comprise a first well of a first well type and multiple wells of a second well type, wherein a location of the first well of the first well type and locations of the wells of the second well type are fixed with respect to their corresponding template, wherein the first well type will accept an image while preventing one or more background design elements from being disposed therein, wherein each of the one or more background design elements comprises a virtual design that is configured to resemble a decorative element placed in a physical memorabilia project, wherein each of the wells of the second well type will each accept an individual background design element while preventing the image from being disposed therein, wherein the wells of the second well type are divided into well classes, and wherein wells of the second well type that are of the same well class are governed by similar pre-determined rules, such that a change to one of the wells that is of the second well type and of a first well class will cause a similar change to another well of the second well type and of the first well class;

a first image to be placed in the first well; and multiple pieces of the one or more background design elements to be placed in the wells of the second well type.

22. The computer program product of claim 21, wherein computer program code means is further comprised of executable code for automatically receiving and retaining the image in a first orientation when the template is rotated about its center by 90 degrees and 180 degrees.

23. The computer program product of claim 21, wherein the computer program code means is further comprises of executable code for implementing a process for rendering the graphical memorabilia project in a form selected from (i) an electronic form; and (ii) a physically printed form.

24. The computer program product of claim 21, wherein the change to the one of the wells that is of the second well type and of the first well class comprises changing one of the wells of the first template and wherein the similar change to another well of the second well type and of the first well class comprises changing a well on the second template.

\* \* \* \* \*